(12) United States Patent
Crane et al.

(10) Patent No.: US 11,376,940 B2
(45) Date of Patent: Jul. 5, 2022

(54) HIGHLY MOBILE ROBOT FOR REMOTE INSPECTION

(71) Applicant: UNIVERSITY OF FLORIDA RESEARCH FOUNDATION, INCORPORATED, Gainesville, FL (US)

(72) Inventors: Carl D. Crane, Gainesville, FL (US); Shannon Ridgeway, Gainesville, FL (US); Tim Williams, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 362 days.

(21) Appl. No.: 16/704,224

(22) Filed: Dec. 5, 2019

(65) Prior Publication Data

US 2020/0189376 A1 Jun. 18, 2020

Related U.S. Application Data

(60) Provisional application No. 62/779,266, filed on Dec. 13, 2018.

(51) Int. Cl.
*B60K 1/02* (2006.01)
*B60K 17/04* (2006.01)
*B60K 17/22* (2006.01)

(52) U.S. Cl.
CPC ............... *B60K 1/02* (2013.01); *B60K 17/04* (2013.01); *B60K 17/22* (2013.01)

(58) Field of Classification Search
CPC .......... B60K 1/02; B60K 17/04; B60K 17/22; B60K 17/043; B60K 17/30;
(Continued)

(56) References Cited

U.S. PATENT DOCUMENTS

| 4,683,973 A | * | 8/1987 | Honjo | B60K 17/303 |
| | | | | 280/47.11 |
| 4,917,200 A | * | 4/1990 | Lucius | B62D 11/10 |
| | | | | 475/23 |

(Continued)

FOREIGN PATENT DOCUMENTS

CN 110404904 B * 10/2020 ............. B08B 9/087

*Primary Examiner* — Darlene P Condra
(74) *Attorney, Agent, or Firm* — Alston & Bird LLP

(57) ABSTRACT

A robotic vehicle can include a plurality of motors coupled to a plurality of gearboxes, each gearbox of the plurality of gearboxes configured to be rotated, a plurality of nested driveshafts coupled to the plurality of gearboxes and including at least a first driveshaft and a second driveshaft, and a plurality of appendages operably coupled to the plurality of gearboxes. A particular appendage of the plurality of appendages can be configured to be rotated in response to a rotational motion of the first driveshaft. The robotic vehicle can include a plurality of wheels coupled to the plurality of appendages and configured to rotate about a plurality of wheel axles. Each wheel of the plurality of wheels can be configured to cause the robotic vehicle to be transported across a contacting surface in response to the rotational motion of the second driveshaft.

20 Claims, 20 Drawing Sheets

(58) Field of Classification Search
CPC .......... B60K 2007/0046; B60K 17/356; B60K 17/36; B60K 7/0007; B60Y 2200/16; B60Y 2200/45; B60Y 2200/60
See application file for complete search history.

(56) References Cited

U.S. PATENT DOCUMENTS

| | | | |
|---|---|---|---|
| 4,977,971 A | 12/1990 | Crane, III et al. | |
| 6,145,611 A * | 11/2000 | Haddad, Sr. | B60K 17/30 180/65.6 |
| 6,491,127 B1 * | 12/2002 | Holmberg | B62D 7/026 301/6.5 |
| 6,948,576 B2 * | 9/2005 | Angeles | B60L 15/2054 180/65.6 |
| 8,590,664 B2 * | 11/2013 | Terashima | B60K 7/0007 180/6.5 |
| 10,640,159 B2 * | 5/2020 | Bliss | B62D 55/075 |
| 2008/0246241 A1 * | 10/2008 | Mollhagen | B60G 9/027 280/124.106 |
| 2015/0251715 A1 * | 9/2015 | Hutson | B25J 5/007 180/21 |
| 2019/0388166 A1 * | 12/2019 | Frederick | B25J 9/0087 |

* cited by examiner

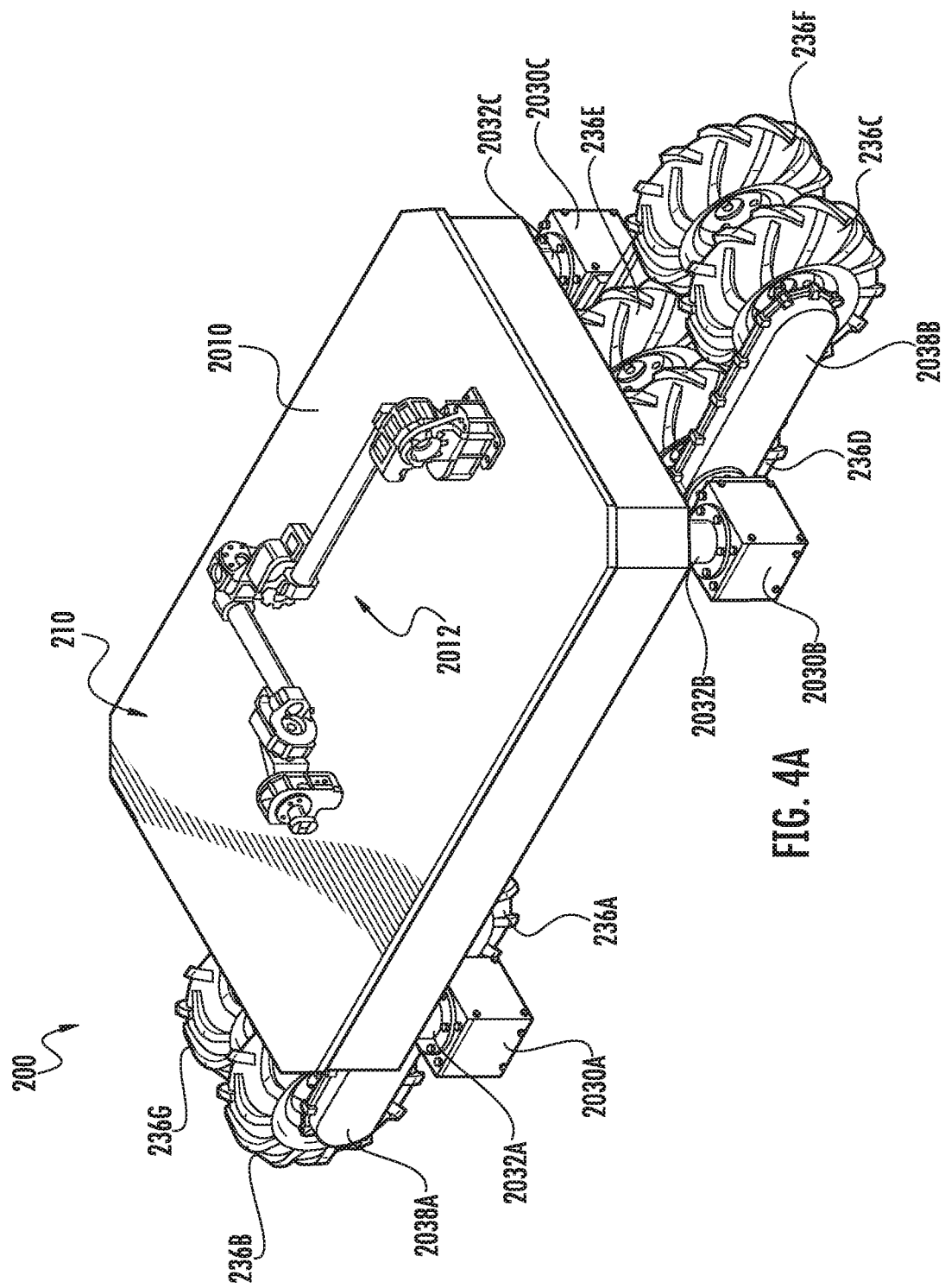

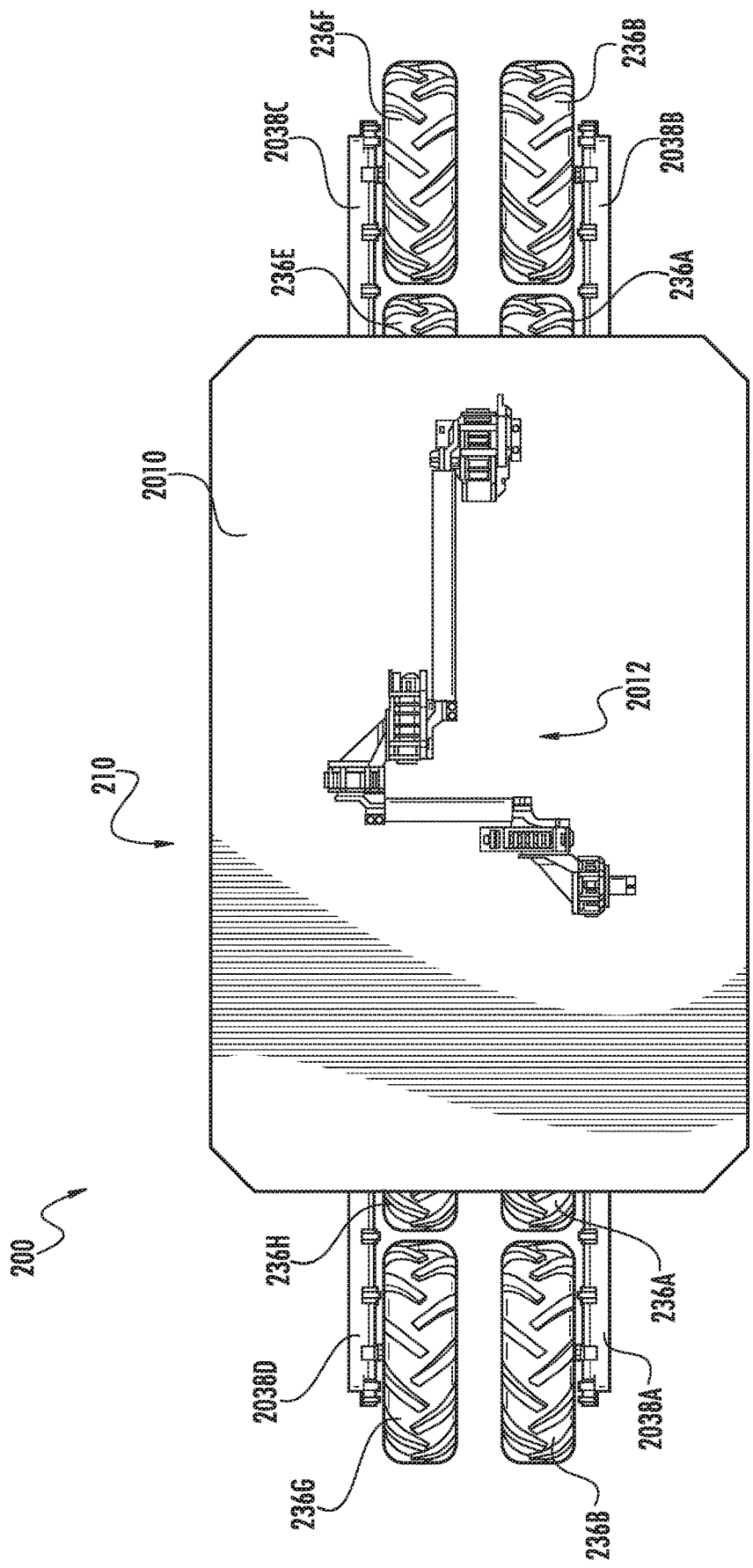

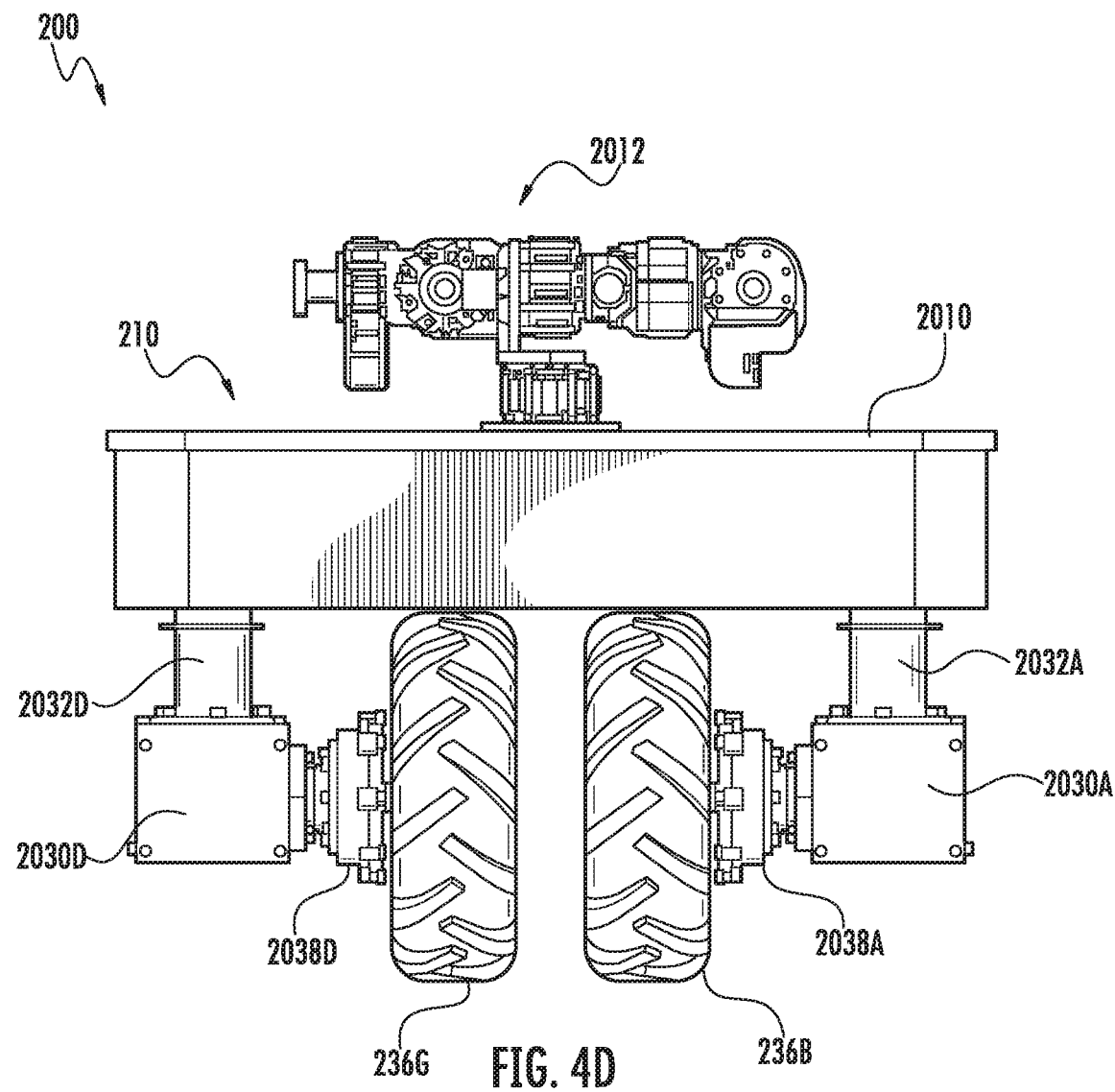

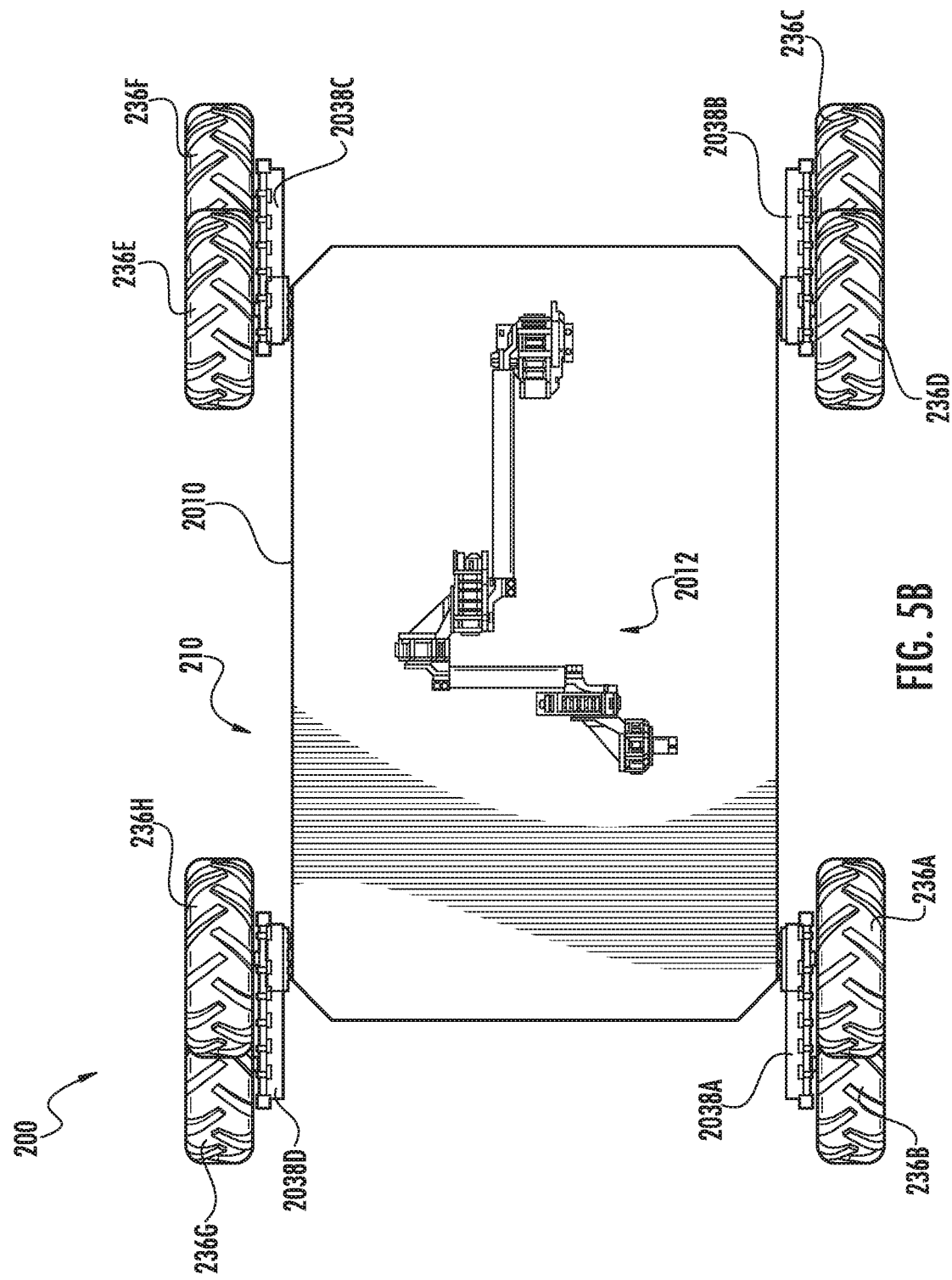

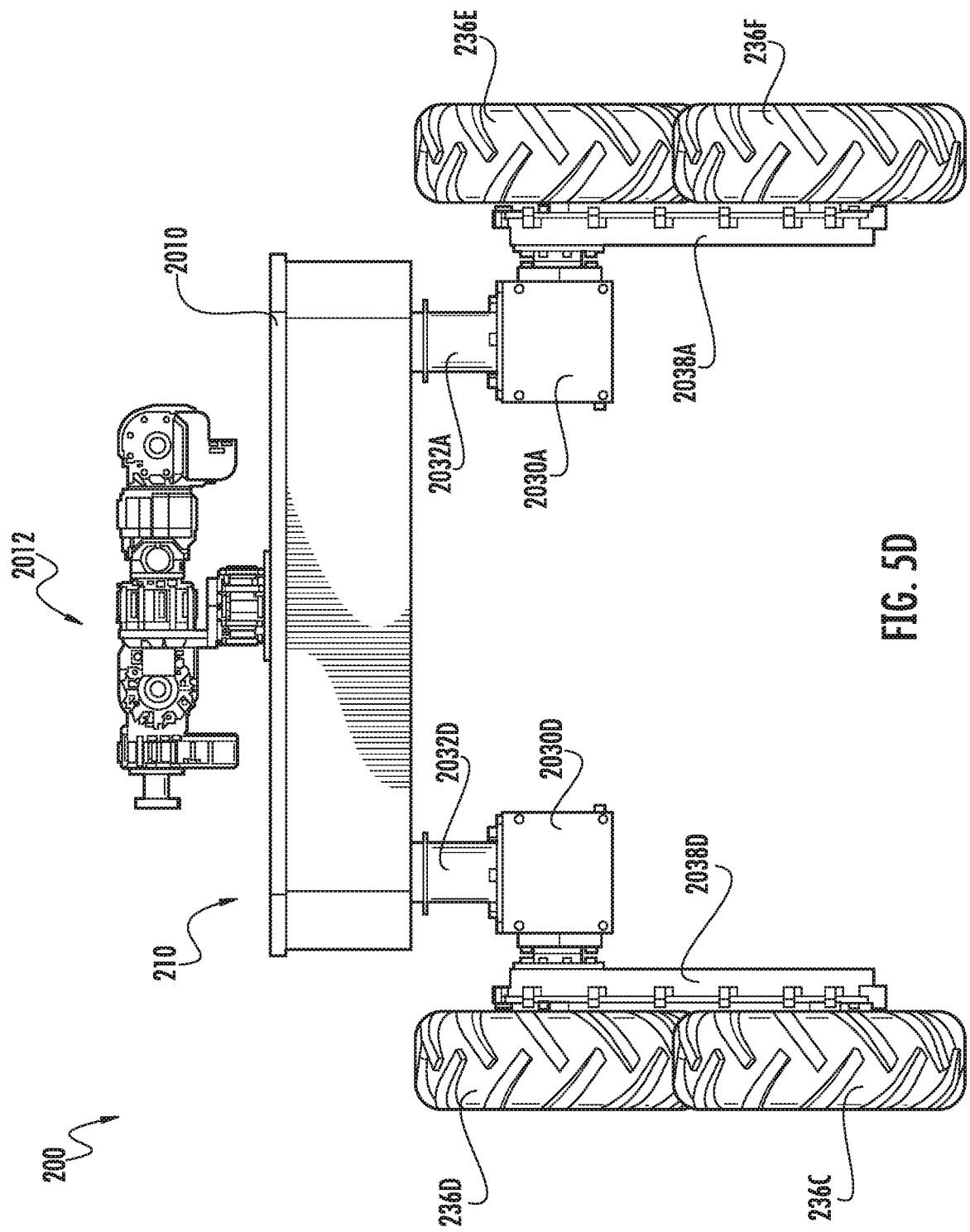

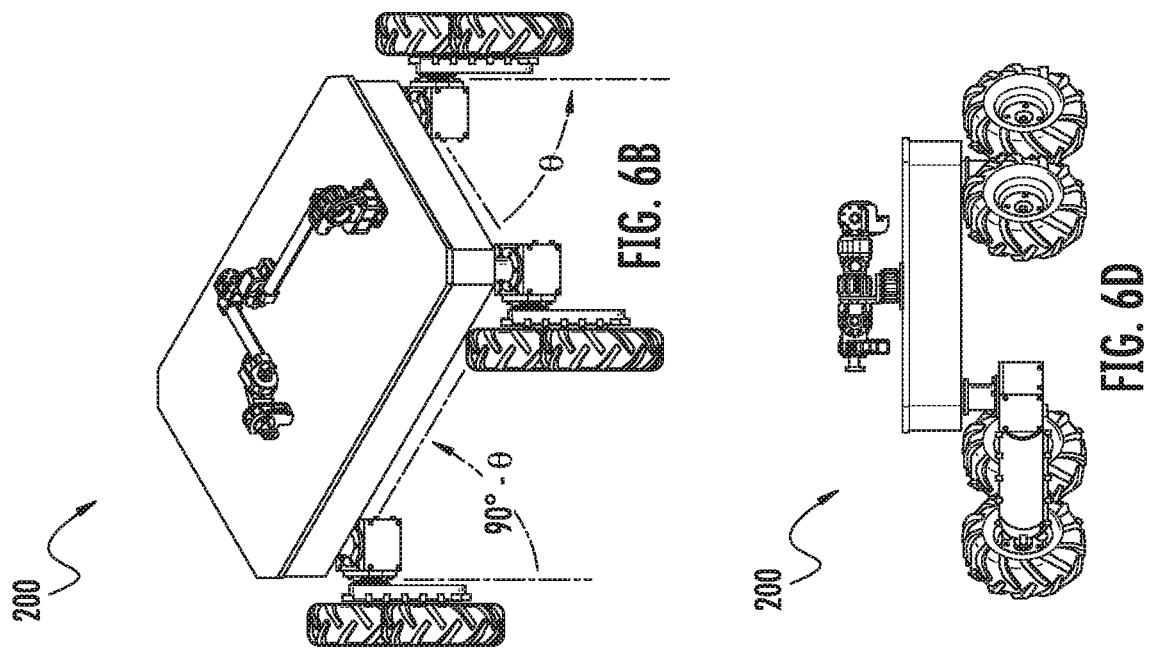
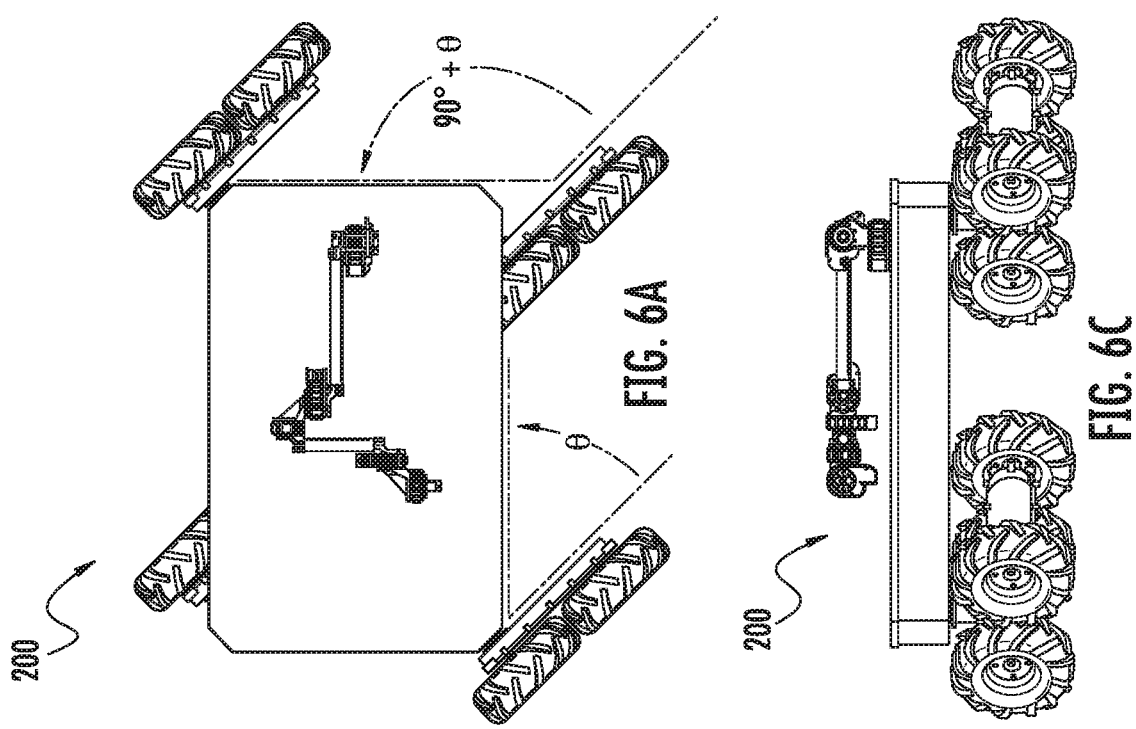

HIGHLY MOBILE ROBOT FOR REMOTE INSPECTION

CROSS-REFERENCE TO RELATED APPLICATIONS

This application claims priority to and the benefit of U.S. Provisional Patent Application Ser. No. 62/779,266, filed Dec. 13, 2018 and titled "Highly Mobile Robot for Remote Inspection," the entire contents of which is hereby incorporated herein by reference in its entirety for all purposes.

STATEMENT OF GOVERNMENT SUPPORT

This invention was made with government support under Grant No. DE-EM0004384 awarded by the U.S. Department of Energy (DOE). The government has certain rights in the invention.

TECHNICAL FIELD

An example embodiment relates generally to robotic apparatus and, more particularly, to a robotic apparatus configured to traverse confined space environments.

BACKGROUND

In many enclosed or confined spaces, such as tanks, vaults, or tunnels, entry by humans may be overly dangerous, illegal, or even lethal. Robotic vehicles are often utilized to access, survey, and work in environments unfit for human occupation. When designing robotic vehicles for such harsh environments, there is typically a trade-off between ease of access by the robotic vehicle to the environment on the one hand and robustness and maneuverability on the other hand. Therefore, there is a long-felt need in the industry for robotic vehicles that are configurationally suitable to enter confined space environments and also durable and stable enough to traverse and operate in topographically challenging and environmentally harsh conditions.

SUMMARY

Described generally herein is a robotic vehicle, and more specifically a robotic vehicle including a drive control system with nested bevel gears and a two gearbox configuration which can be placed into a compact conformation for entering confined spaces. In some embodiments, a robotic vehicle can include a main body or substructure configured to house and/or support other components of the robotic vehicle. In some embodiments, the main body can include or support a motor or a plurality of motors operably coupled to a gearbox or a plurality of gearboxes. In some embodiments, the motor or plurality of motors can be rotatably coupled to the gearbox or plurality of gearboxes. In some embodiments, each gearbox of the plurality of gearboxes can include a gear or a plurality of gears. In some embodiments, each gearbox of the plurality of gearboxes can be configured to be rotated.

In some embodiments, the robotic vehicle can include a plurality of nested driveshafts operably coupled to the plurality of gearboxes. In some embodiments, each nested driveshaft of the plurality of nested driveshafts can comprise a first driveshaft and a second driveshaft. In some embodiments, the nested driveshafts can comprise the first driveshaft, the second driveshaft disposed within the first driveshaft and configured to rotate freely from the first driveshaft, and a third driveshaft disposed within the second driveshaft and configured to rotate freely from the first driveshaft and the second driveshaft. In some embodiments, a plurality of appendages can be operably coupled to the plurality of gearboxes. In some embodiments, the first driveshaft can be configured to cause and control rotation of one or more of the plurality of gearboxes and the second driveshaft can be configured to cause and control rotation of one or more of the plurality of appendages. In some embodiments, the plurality of appendages can be configured to be rotated along a vertical axis in response to a rotational motion of the first driveshaft. In other embodiments, the plurality of appendages can be configured to be rotated along a horizontal axis in response to the rotational motion of the first driveshaft. In some embodiments, the robotic vehicle can include a plurality of wheels operably coupled to the plurality of appendages. In some embodiments, the plurality of wheels can be configured to rotate about a plurality of wheel axles. In some embodiments, the third driveshaft can be configured to cause and control rotation of one or more of the plurality of wheels. In some embodiments, each wheel of the plurality of wheels can be configured to cause the robotic vehicle to be transported across a contacting surface in response to the rotational motion of the second driveshaft when in contact with the contacting surface.

In some embodiments, the robotic vehicle can include an electronic control system comprising at least one processor and at least one memory device. In some embodiments, the electronic control system configured to operate one or more motors of the plurality of motors to rotate one or more gearboxes of the plurality of gearboxes, operate one or more other motors of the plurality of motors to rotate the first driveshaft such that one or more appendages of the plurality of appendages is rotated along the first axis, and/or operate one or more of the remaining motors of the plurality of motors to rotate the second driveshaft such that one or more wheels of the plurality of wheels is rotated. In some embodiments, the robotic vehicle can include one or more dedicated motor drivers (e.g., motor controllers) to actuate one or more of the motors. In some embodiments, the dedicated motor drivers are separate from or integrated with the primary electronics and/or the vehicle computer.

A method of operating a robotic vehicle, such as the robotic vehicle described above, including operating one or more motors of the plurality of motors to rotate one or more gearboxes of the plurality of gearboxes until the plurality of appendages are substantially positioned beneath the main body of the robotic vehicle. In some embodiments, the robotic vehicle can include a front side, a back side, a right side and a left side. In some embodiments, a width of the robotic vehicle between the right side and the left side is less than about 500 inches, about 400 inches, about 300 inches, about 200 inches, about 100 inches, about 90 inches, about 80 inches, about 70 inches, about 60 inches, about 50 inches, about 40 inches, about 30 inches, or about 20 inches, inclusive of all values and ranges therebetween. In some embodiments, the width of the robotic vehicle can be between about 10 inches and about 100 inches, about 11 inches and about 95 inches, about 12 inches and about 90 inches, about 13 inches and about 85 inches, about 14 inches and about 80 inches, about 15 inches and about 75 inches, about 16 inches and about 70 inches, about 17 inches and about 65 inches, about 18 inches and about 60 inches, about 19 inches and about 55 inches, about 20 inches and about 50 inches, about 21 inches and about 45 inches, about 22 inches and about 40 inches, about 23 inches and about 35 inches, about 24 inches and about 30 inches, about 10 inches and about 95 inches, about 10 inches and about 90 inches, about 10 inches and about 85 inches, about 10 inches and about 80 inches, about 10 inches and about 75 inches, about 10 inches and about 70 inches, about 10 inches and about 65 inches, about 10 inches and about 60 inches, about 10 inches and about 55 inches, about 10 inches and about 50 inches, about 10 inches and about 45 inches, about 10 inches and about 40 inches, about 10 inches and about 35 inches, about 10 inches and about 30 inches, about 10 inches and about 25 inches, about 10 inches and about 20 inches, about 10 inches and about 15 inches, about 15 inches and about 100 inches, about 20 inches and about 100 inches, about 25 inches and about 100 inches, about 30 inches and about 100 inches, about 35 inches and about 100 inches, about 40 inches and about 100 inches, about 45 inches and about 100 inches, about 50 inches and about 100 inches, about 55 inches and about 100 inches, about 60 inches and about 100 inches, about 65 inches and about 100 inches, about 70 inches and about 100 inches, about 75 inches and about 100 inches, about 80 inches and about 100 inches, about 85 inches and about 100 inches, about 90 inches and about 100 inches, or about 95 inches and about 100 inches, inclusive of all values and subranges therebetween. In some embodiments, the width of the robotic vehicle can be greater than about 10 inches, about 15 inches, about 20 inches, about 25 inches, about 30 inches, about 35 inches, about 40 inches, about 45 inches, about 50 inches, about 55 inches, about 60 inches, about 65 inches, about 70 inches, about 75 inches, about 80 inches, about 85 inches, about 90 inches, about 95 inches, about 100 inches, about 200 inches, about 300 inches, about 400 inches, or about 500 inches, inclusive of all values and ranges therebetween.

In some embodiments, the robotic vehicle can be configured such that one or more motors of the plurality of motors can be operated to rotate one or more gearboxes of the plurality of gearboxes until the plurality of appendages are substantially positioned beneath the main body of the robotic vehicle. In other words, in some embodiments, the robotic vehicle can include appendages, or flippers, that can be rotated until they are tucked underneath the main body of the robotic vehicle to sufficiently reduce the width of the robotic vehicle such that it may enter and/or traverse confined spaces.

A method of operating a robotic vehicle, such as the robotic vehicle described herein wherein one or more wheels of the plurality of wheels is coupled to each appendage of the plurality of appendages, can include operating one or more motors of the plurality of motors to rotate the first driveshaft such that one or more appendages of the plurality of appendages is rotated along the first axis until only one wheel of the plurality of wheels coupled to each appendage of the plurality of appendages engages the contacting surface. The method can further include operating one or more other motors of the plurality of motors to rotate the second driveshaft such that the plurality of wheels are rotated about the wheel axles.

A method of operating a robotic vehicle, such as the robotic vehicle described herein, wherein one or more gearboxes of the plurality of gearboxes are positioned beneath one or more other gearboxes of the plurality of gearboxes, the one or more other gearboxes being coupled to one or more driveshafts of the plurality of driveshafts, can include operating one or more motors of the plurality of motors to rotate the one or more other gearboxes such that one or more appendages of the plurality of appendages are rotated about the one or more other gearboxes along the horizontal axis.

In some embodiments, a robotic vehicle can further include a payload control arm coupled to the main body and configured to carry out one or more tasks during operation of the robotic vehicle. In some embodiments, the payload control arm can be configured to grasp, pick up, move, and release objects, move debris during transportation of the robotic vehicle, and the like. In some embodiments, the robotic vehicle can include one or more motors, one or more hydraulic motors, one or more control circuits, one or more actuators, one or more electromechanical drives, or the like.

In some embodiments, the plurality of motors can include a first motor operably coupled to a first driveshaft of the plurality of driveshafts, in a first gearbox of the plurality of gearboxes and a second gearbox of the plurality of gearboxes, the first motor configured to cause controlled rotation of the second gearbox of the plurality of gearboxes along the horizontal axis. In some embodiments, the plurality of motors can further include a second motor operably coupled to a second driveshaft of the plurality of driveshafts, in the first gearbox of the plurality of gearboxes, the second driveshaft nested within the first driveshaft and operably coupled to an appendage, the second motor configured to rotate the appendage along the vertical axis. In some embodiments, the plurality of motors can further include a third motor operably coupled to a third driveshaft of the plurality of driveshafts, in the first gearbox of the plurality of gearboxes, the third driveshaft nested within the second driveshaft and configured to rotate one or more wheels of the plurality of wheels about one or more wheel axles of the plurality of wheel axles.

In some embodiments, a drive control system for a robotic vehicle, such as a robotic vehicle described herein, can include a first motor operably coupled to a first gear in a first gearbox, the first gear operably coupled to an outer driveshaft operably coupled to a second gearbox, the first motor configured to cause controlled rotation of the second gearbox along a horizontal axis with respect to the first gearbox. In some embodiments, the drive control system can further include a second motor operably coupled to a second gear in the first gearbox, the second gear operably coupled to a middle driveshaft nested within the outer driveshaft and operably coupled to a third gear in the second gearbox and an appendage operably coupled to and extending from the second gearbox. The second motor can be configured to rotate the appendage along a vertical axis or a horizontal axis with respect to the second gearbox. In some embodiments, the drive control system can further include a third motor operably coupled to a fourth gear in the first gearbox, the fourth gear operably coupled to an inner driveshaft nested within the middle driveshaft and coupled to a fifth gear in the second gearbox and a plurality of wheels operably coupled to the appendage, the third motor configured to rotate one or more wheels about one or more wheel axles. In some embodiments, the drive control system can include one or more dedicated motor drivers (e.g., motor controllers) configured to actuate one or more of the motors.

In some embodiments, the drive control system can further include an electronic control system comprising at least one processor and at least one memory device, the electronic control system configured to at least one of (i) operate the first motor to rotate the first gear in the first gearbox and the outer driveshaft such that the second gearbox rotates along the horizontal axis, (ii) operate the second motor to rotate the second gear, the middle driveshaft, and the third gear, such that the appendage is rotated along the vertical axis, and (iii) operate the third motor to rotate the fourth gear, the inner driveshaft, and the fifth gear such that the one or more wheels are rotated about the one or more wheel axles. In some embodiments, the dedicated motor drivers are separate from or integrated with the primary electronics and/or the vehicle computer.

In some embodiments, a drive control system for a robotic vehicle can include an outer driveshaft operably coupled to a first gear in a first gearbox at a proximal end and to a second gearbox at a distal end, the second gearbox configured to be rotated about a center point along a horizontal axis. In some embodiments the drive control system can further include a first motor operably coupled to the first gear and configured to cause controlled rotation of the second gearbox along the horizontal axis. In some embodiments, the drive control system can further include a middle driveshaft operably coupled to a second gear in the first gearbox at a proximal end and a third gear in the second gearbox at a distal end. In some embodiments, the drive control system can further include an appendage operably coupled to the third gear in the second gearbox. The appendage can be configured to be rotated about the second gearbox along a vertical axis or a horizontal axis. In some embodiments, the drive control system can further include a second motor operably coupled to the second gear and configured to cause controlled rotation of the appendage along the vertical axis. In some embodiments, the drive control system can further include an inner driveshaft operably coupled to a fourth gear in the first gearbox at a proximal end and a fifth gear in the second gearbox at a distal end. In some embodiments, the drive control system can further include a plurality of wheels coupled to the appendage, operably coupled to the fifth gear, and configured to be rotated about a plurality of wheel axles. In some embodiments, the drive control system can further include a third motor operably coupled to the fourth gear and configured to cause controlled rotation of the plurality of wheels about the plurality of wheel axles. In some embodiments, a robotic vehicle can include more than one of such drive control systems. For instance, in some embodiments, the robotic vehicle can include two such drive control systems, three such drive control systems, four such drive control systems, and the like. In some embodiments, the drive control system, or the robotic vehicle comprising one or more such drive control systems can further include an electronic control system comprising at least one processor and at least one memory device. In some embodiments, the electronic control system configured to at least one of (i) operate the first motor to rotate the first gear in the first gearbox and the outer driveshaft such that the second gearbox rotates along the horizontal axis, (ii) operate the second motor to rotate the second gear, the middle driveshaft, and the third gear, such that the appendage is rotated along the vertical axis, and (iii) operate the third motor to rotate the fourth gear, the inner driveshaft, and the fifth gear such that the one or more wheels are rotated about the one or more wheel axles. In some embodiments, the electronic control system or a component thereof can include a computer program product configured to carry out a series of such operations simultaneously. In some embodiments, for instance, the electronic control system can cause the first motor to rotate the second gearbox about the outer driveshaft along a horizontal axis such that a distal end of the appendage is rotated away from the main body to, for instance, angle the one or more wheels away from a current direction of travel of the robotic vehicle at the same time that the electronic control system causes the second motor to rotate the appendage down such that the one or more wheels operably engage the contacting surface (e.g., the ground, a surface of a shaft or conduit, a tank floor, etc.) and the third motor to rotate the one or more wheels about one or more wheel axles such that the robotic vehicle can be caused to change direction and be transported in the second direction.

In some embodiments, a robotic vehicle can include a vehicle body configured to support and house components of the robotic vehicle. In some embodiments, the robotic vehicle can include a first gearbox disposed at the first corner of the vehicle body, an outer driveshaft operably coupled to a first gear in the first gearbox at a proximal end and to a second gearbox at a distal end, the second gearbox configured to be rotated about a center point along a horizontal axis or a vertical axis, and a first motor operably coupled to the first gear and configured to cause controlled rotation of the second gearbox along the horizontal axis or the vertical axis. In some embodiments, the robotic vehicle can include a middle driveshaft operably coupled to a second gear in the first gearbox at a proximal end and a third gear in the second gearbox at a distal end. In some embodiments, the robotic vehicle can include a conveying attachment comprising a proximal end operably coupled to the third gear, a proximal region distal to the proximal end and configured to rotatably engage a first wheel axle, a distal region distal to the proximal region and configured to rotatably engage a second wheel axle, and a distal end. The conveying attachment can be configured to be rotated about the second gearbox along a vertical axis or a horizontal axis. In some embodiments, the robotic vehicle can include a second motor operably coupled to the second gear and configured to cause controlled rotation of the conveying attachment along the vertical axis, an inner driveshaft operably coupled to a fourth gear in the first gearbox at a proximal end and a fifth gear in the second gearbox at a distal end, a first wheel coupled to the conveying attachment at the first wheel axle and a second wheel coupled to the conveying attachment at the second wheel axle, the first wheel and the second wheel operably coupled to the fifth gear such that rotation of the fifth gear causes the first wheel to rotate about the first wheel axle and the second wheel to rotate about the second wheel axle, and a third motor operably coupled to the fourth gear and configured to cause controlled rotation of the plurality of wheels about the plurality of wheel axles. In some embodiments, a range of rotation of the proximal end of the conveying attachment about the second gearbox along the horizontal axis can be greater than about 90°, greater than about 95°, greater than about 100°, greater than about 105°, greater than about 110°, greater than about 115°, greater than about 120°, greater than about 125°, greater than about 130°, greater than about 135°, greater than about 140°, greater than about 145°, greater than about 150°, greater than about 155°, greater than about 160°, greater than about 165°, greater than about 170°, greater than about 175°, greater than about 180°, greater than about 185°, greater than about 190°, greater than about 195°, greater than about 200°, greater than about 205°, greater than about 210°, greater than about 215°, greater than about 220°, greater than about 225°, greater than about 230°, greater than about 235°, greater than about 240°, greater than about 250°, greater than about 260°, greater than about 265°, greater than about 270°, greater than about 275°, greater than about 280°, greater than about 285°, greater than about 290°, greater than about 295°, greater than about 300°, greater than about 305°, greater than about 310° greater than about 315° greater than about 320°, greater than about 325°, greater than about 340°, greater than about 345°, greater than about 350°, greater than about 355°, or 360°, inclusive of all values and ranges therebetween.

In some embodiments, the robotic vehicle can further include an electronic control system comprising at least one processor and at least one memory device, the electronic control system configured to at least one of (i) operate the first motor to cause controlled rotation of the second gearbox along the horizontal axis, (ii) operate the second motor to cause controlled rotation of the conveying attachment along the vertical axis, and (iii) operate the third motor to cause controlled rotation of the plurality of wheels about the plurality of wheel axles.

In some embodiments, a method of operating a robotic vehicle can include operating the first motor to cause controlled rotation of the second gearbox along the horizontal axis until the conveying attachment is substantially positioned beneath the vehicle body. In some embodiments, the robotic vehicle can include a front side, a back side, a right side and a left side. In some embodiments, a diameter of the robotic vehicle with respect to a front side view of the robotic vehicle can be less than about 100 inches, about 90 inches, about 80 inches, about 70 inches, about 60 inches, about 50 inches, about 40 inches, about 30 inches, or about 20 inches, inclusive of all values and ranges therebetween.

BRIEF DESCRIPTION OF THE DRAWINGS

Figure 1:
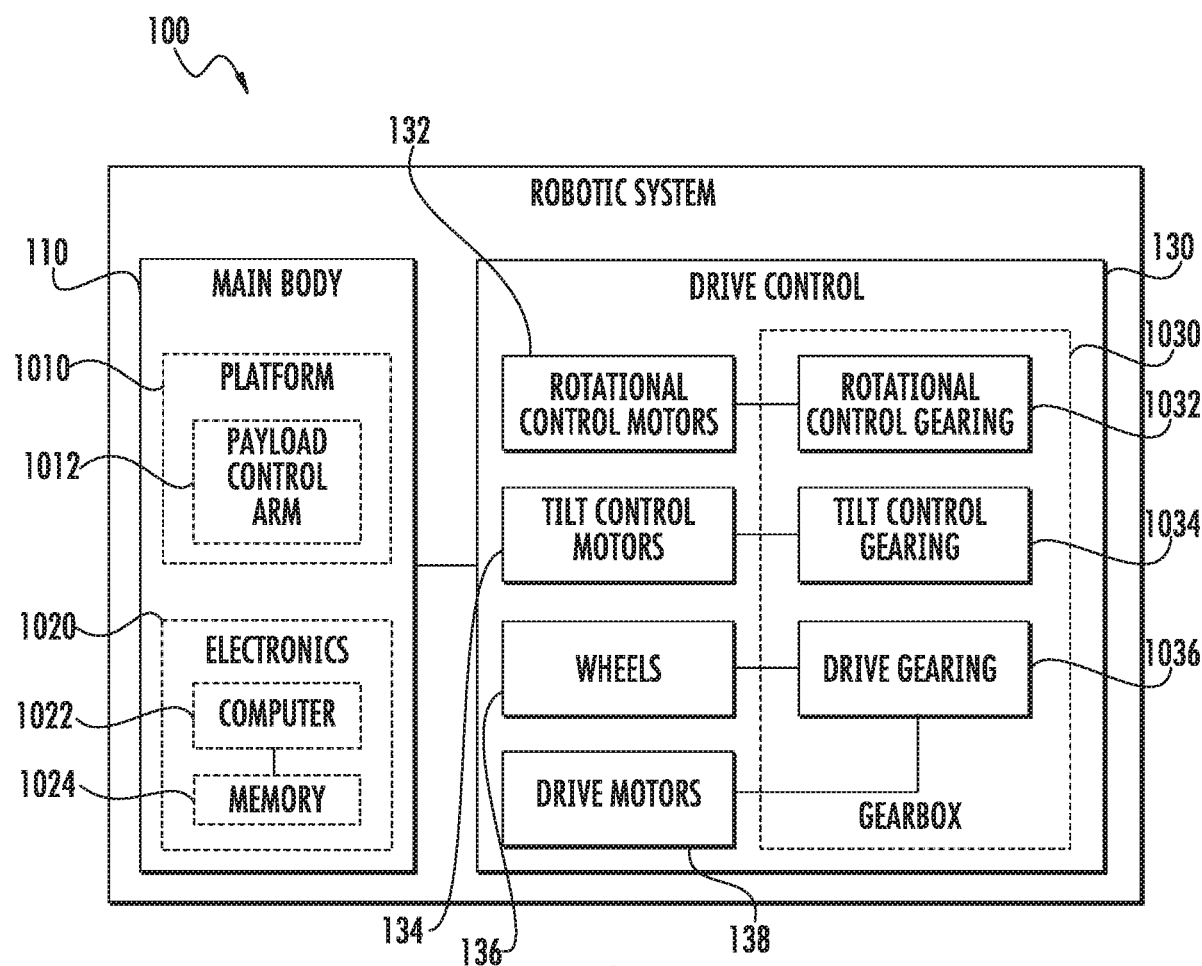
Figure 2A:
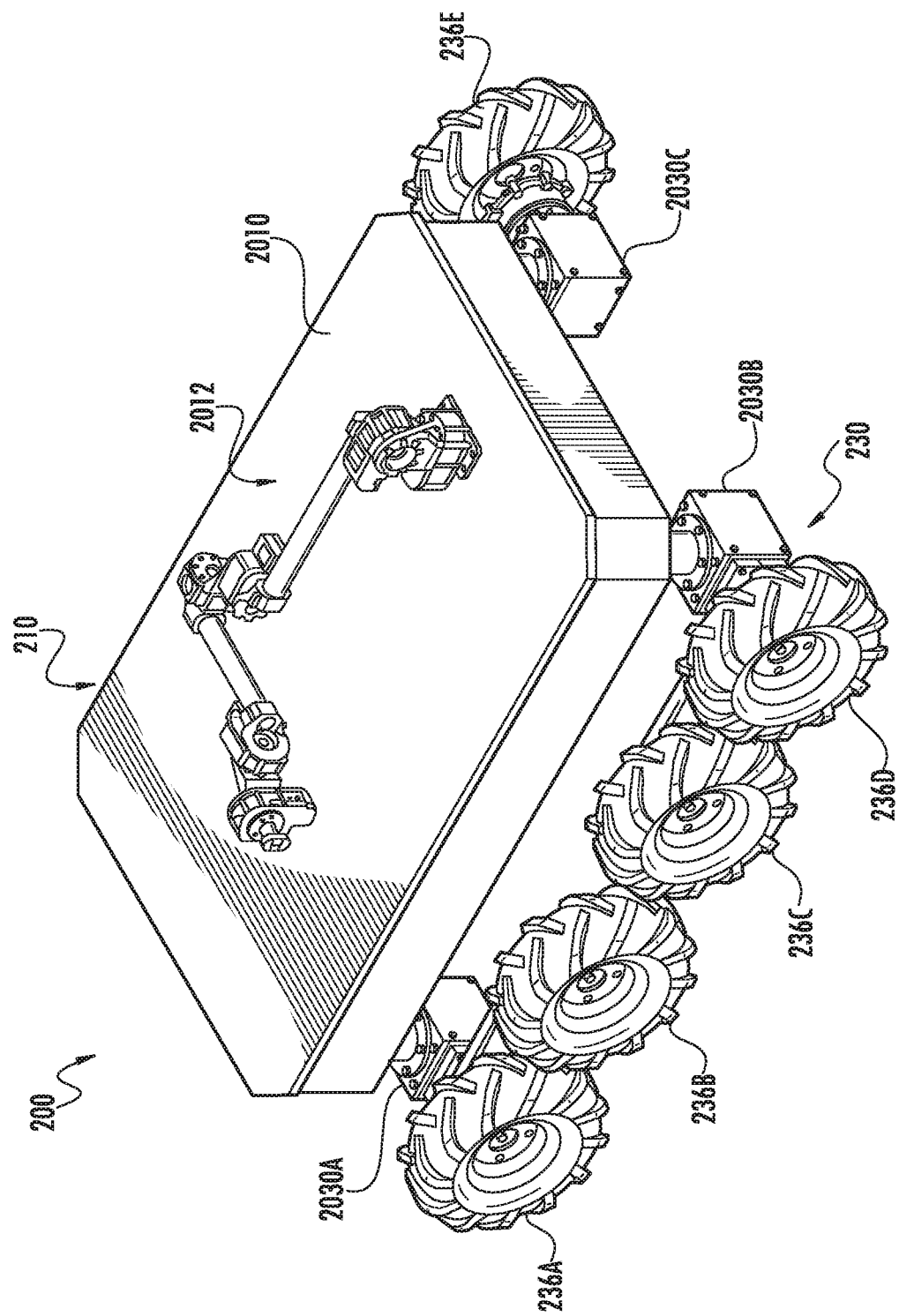
Figure 2B:
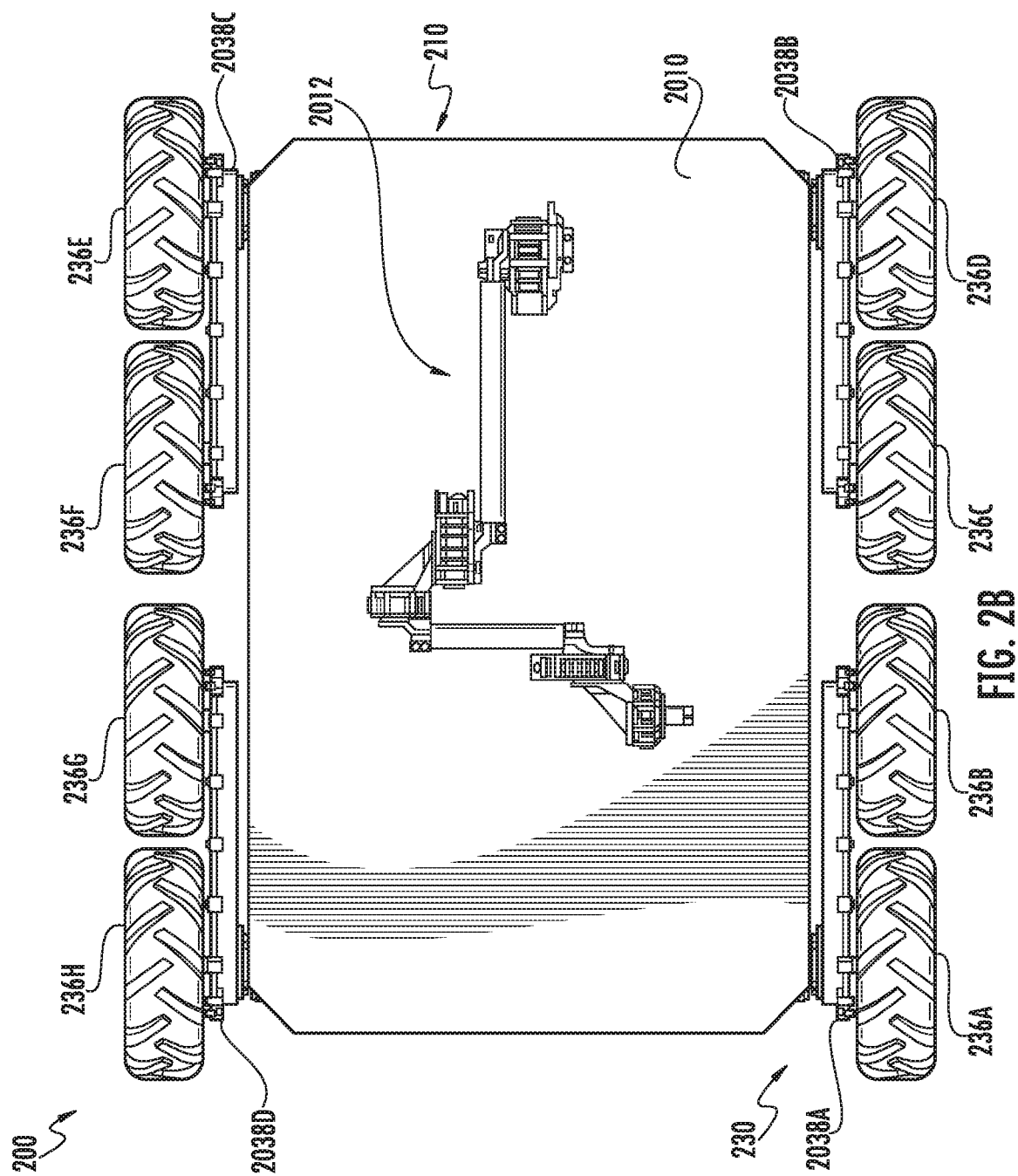
Figure 2C:
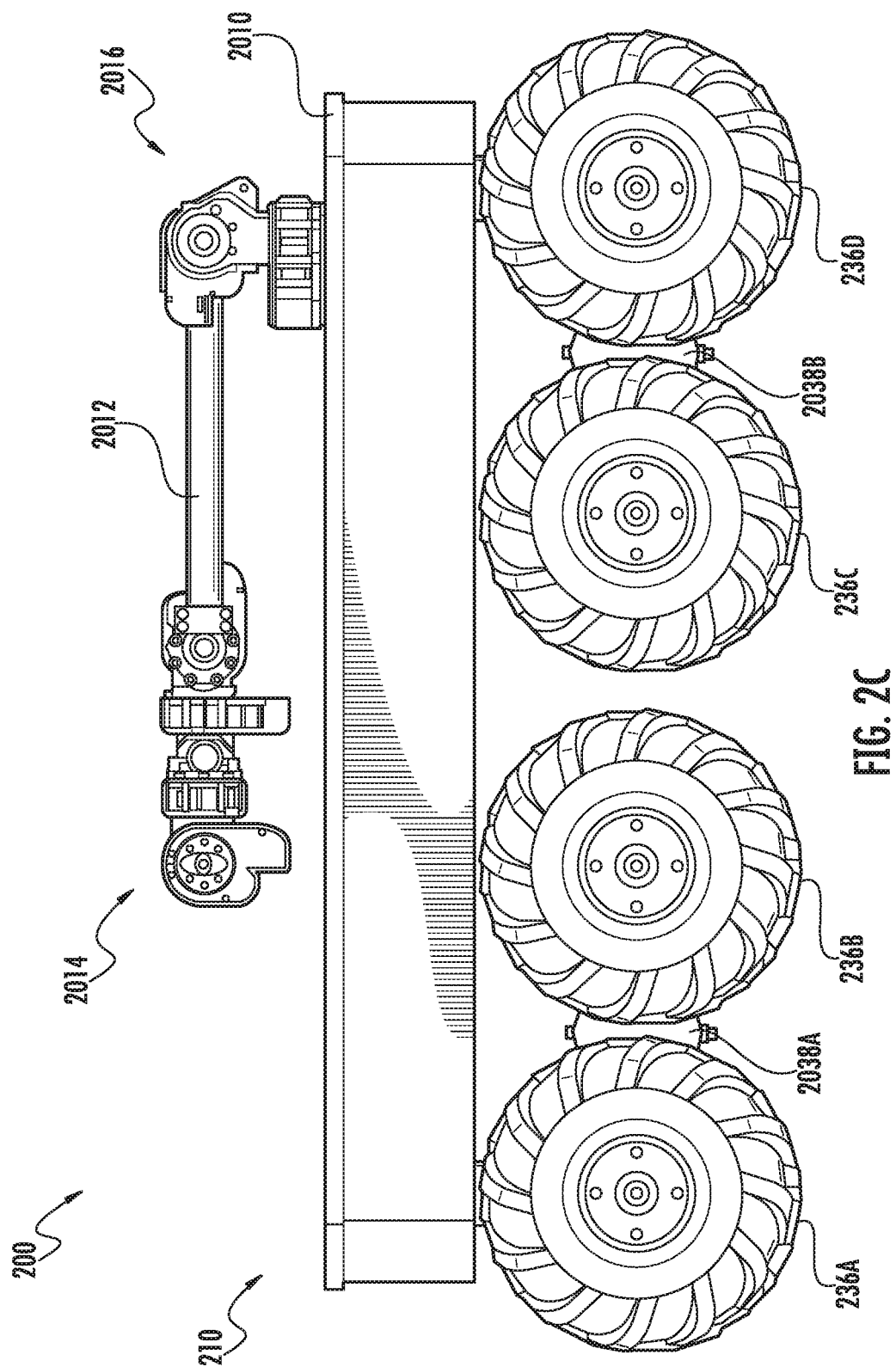
Figure 2D:
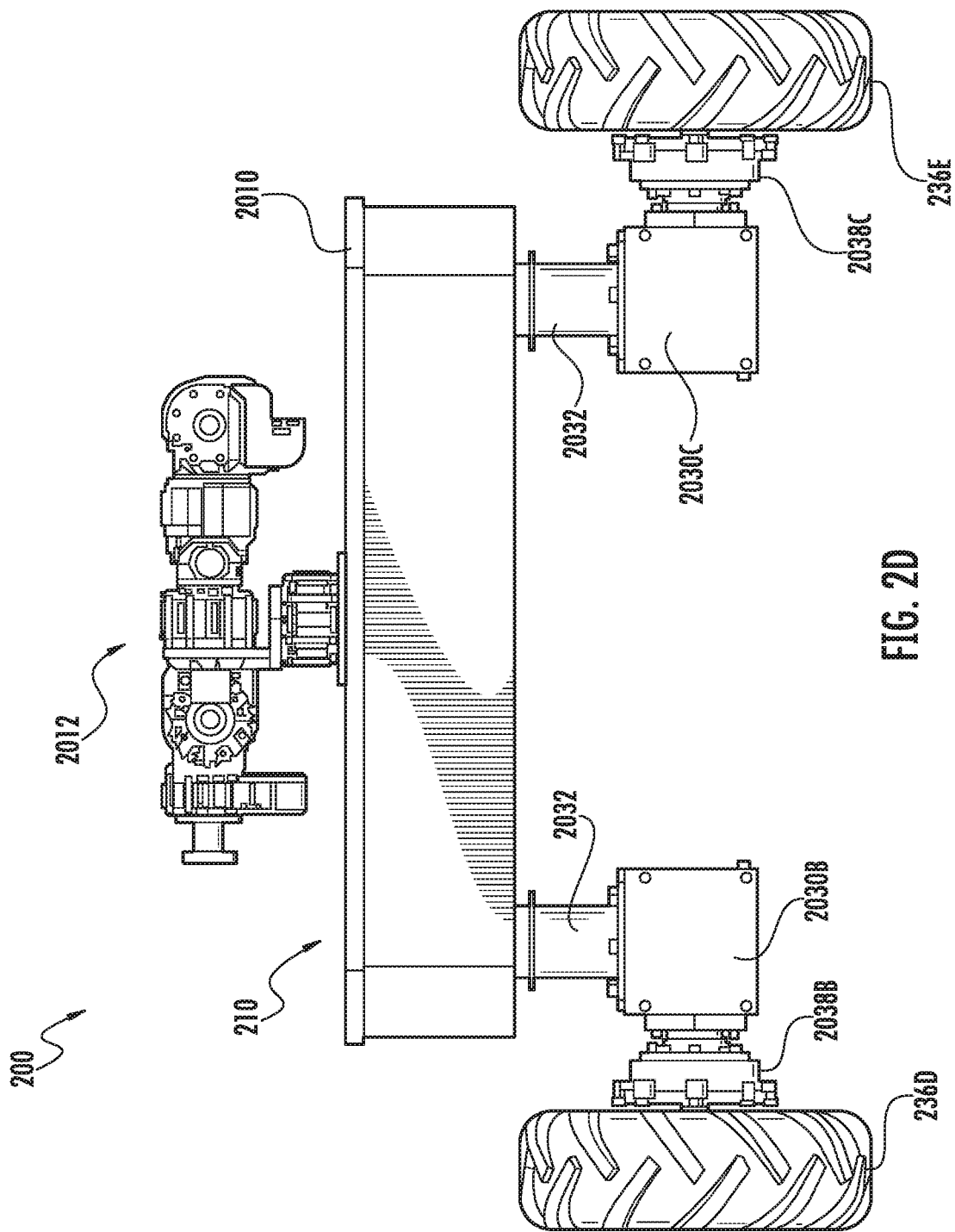
Figure 3:
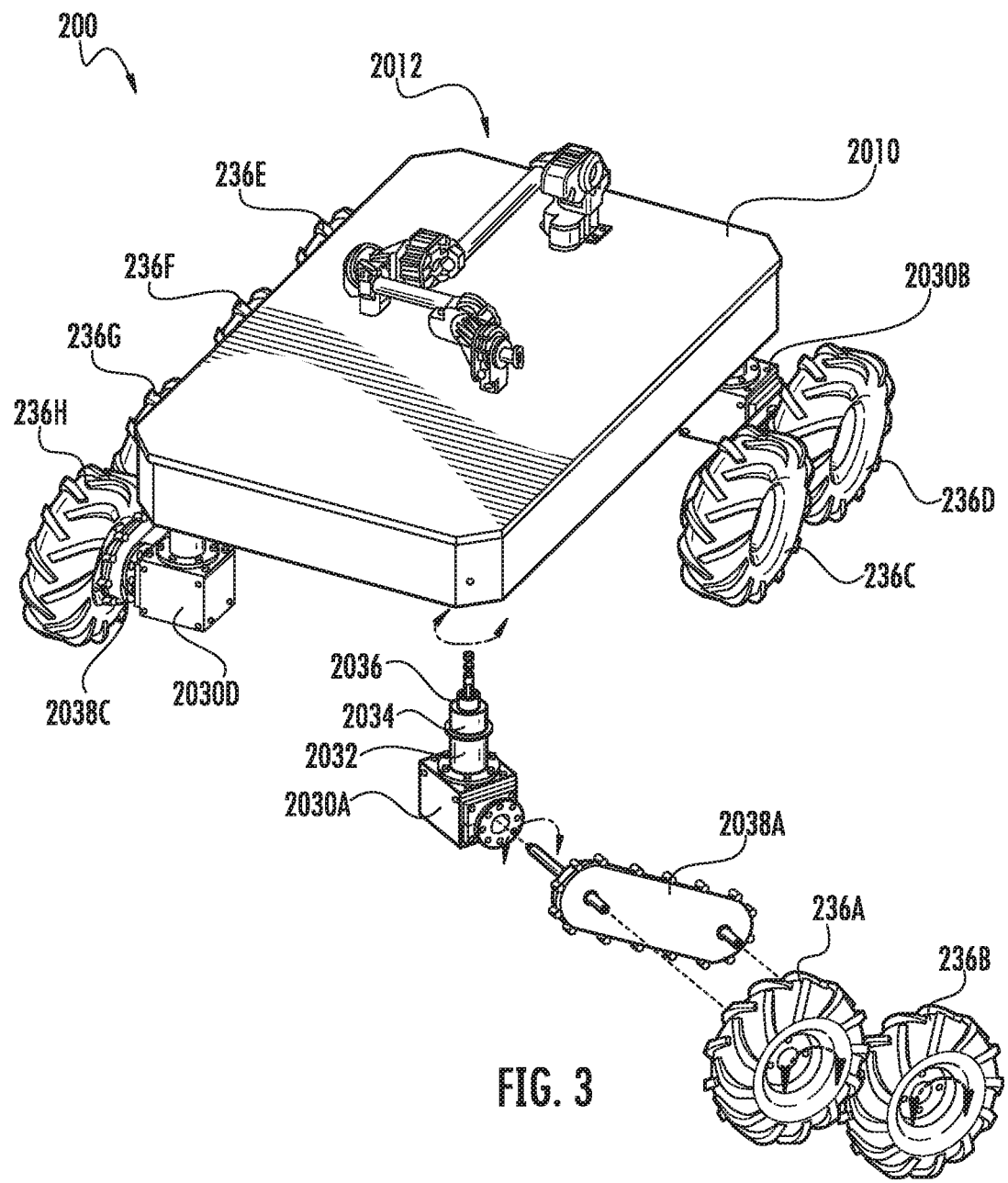
Figure 4C:
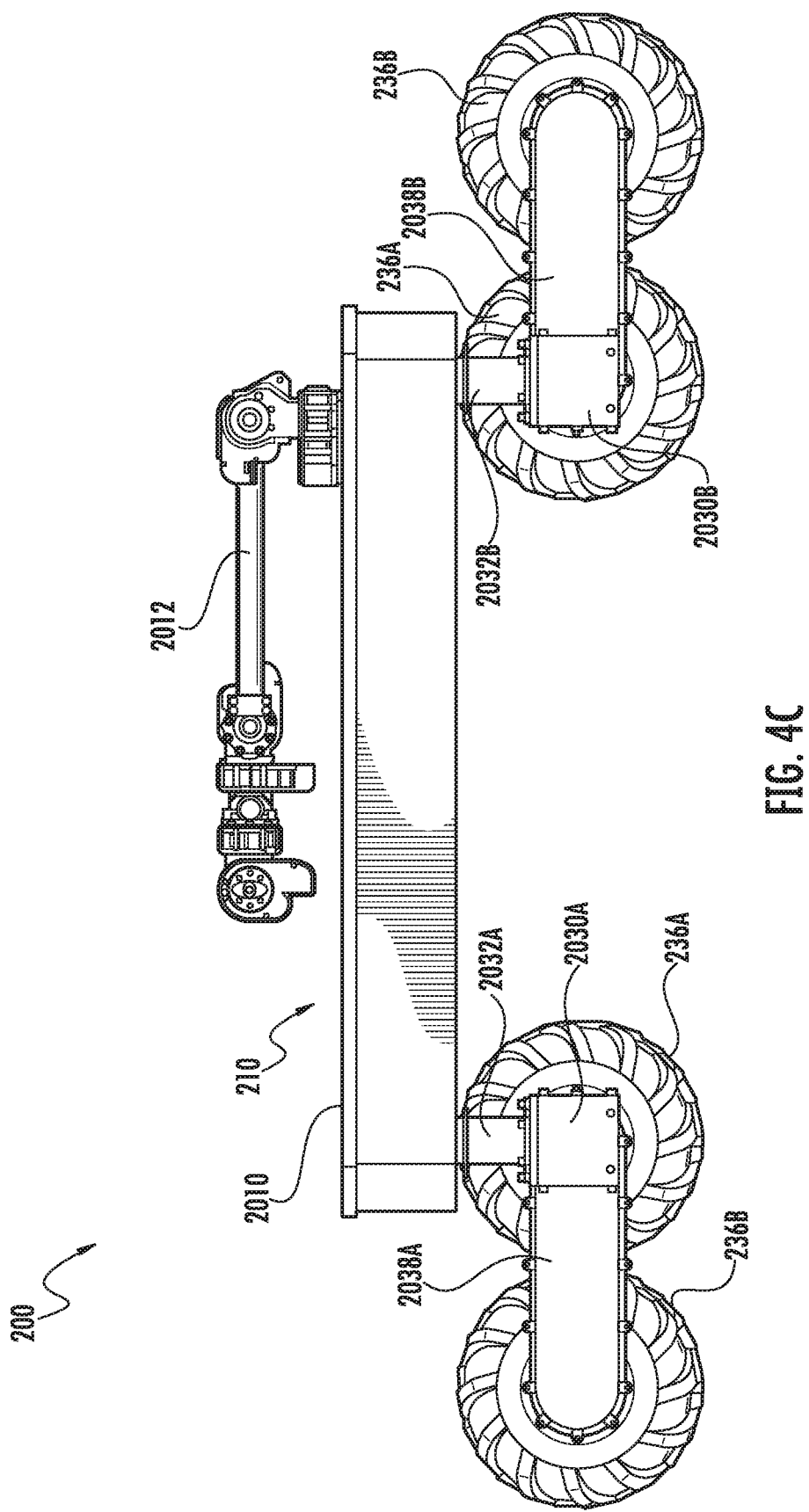
Figure 4E:
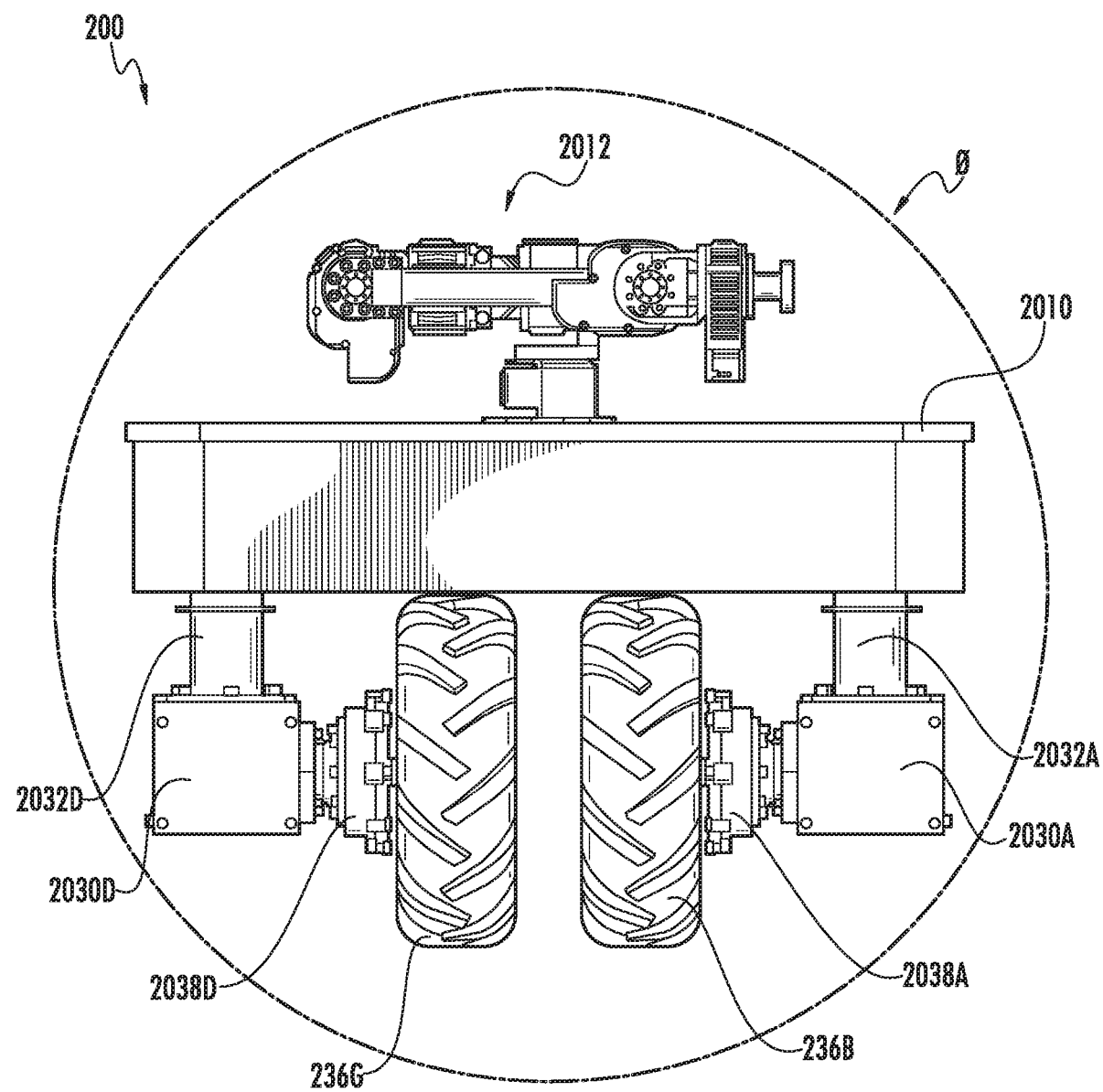
Figure 5A:
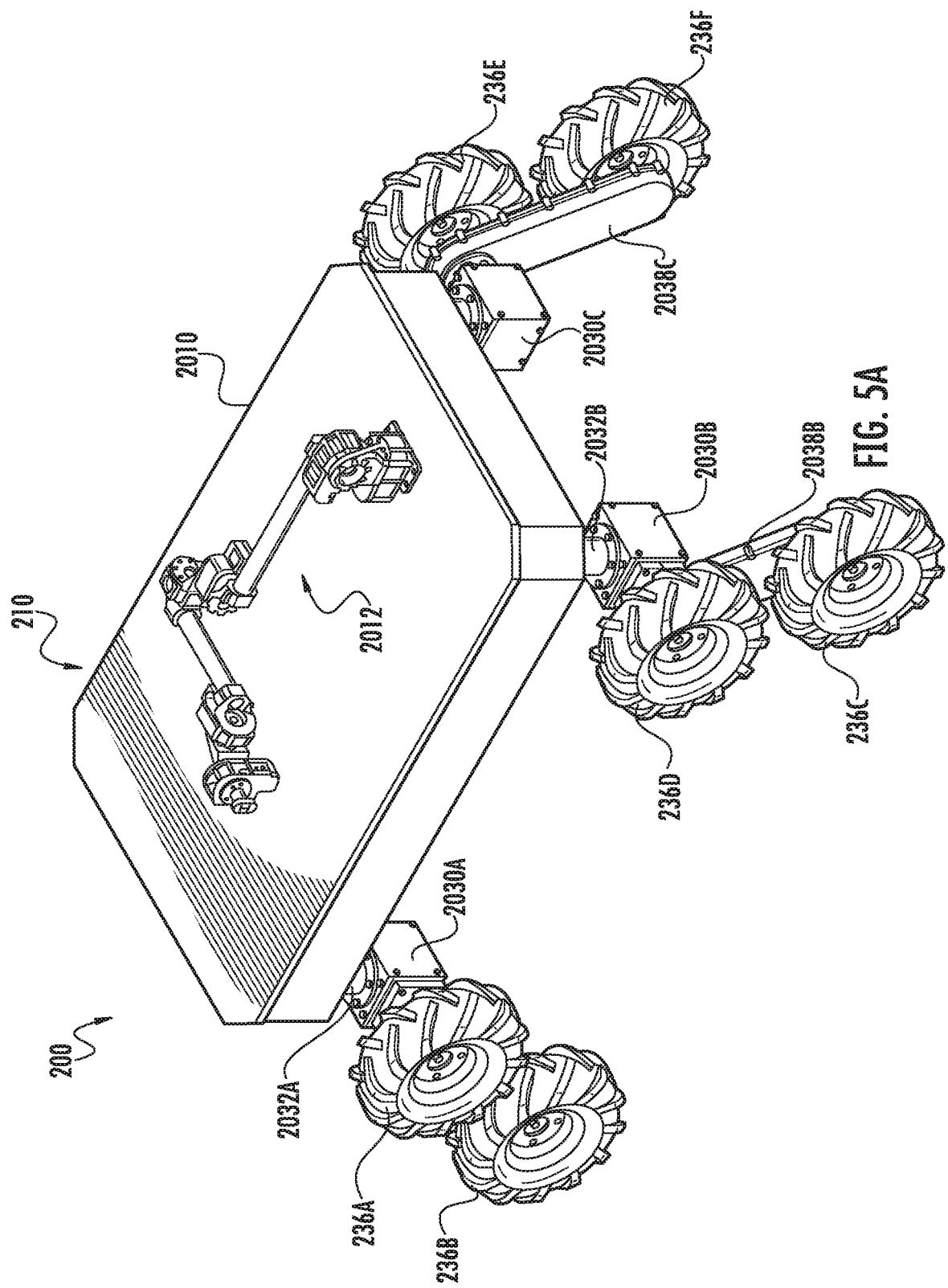
Figure 5C:
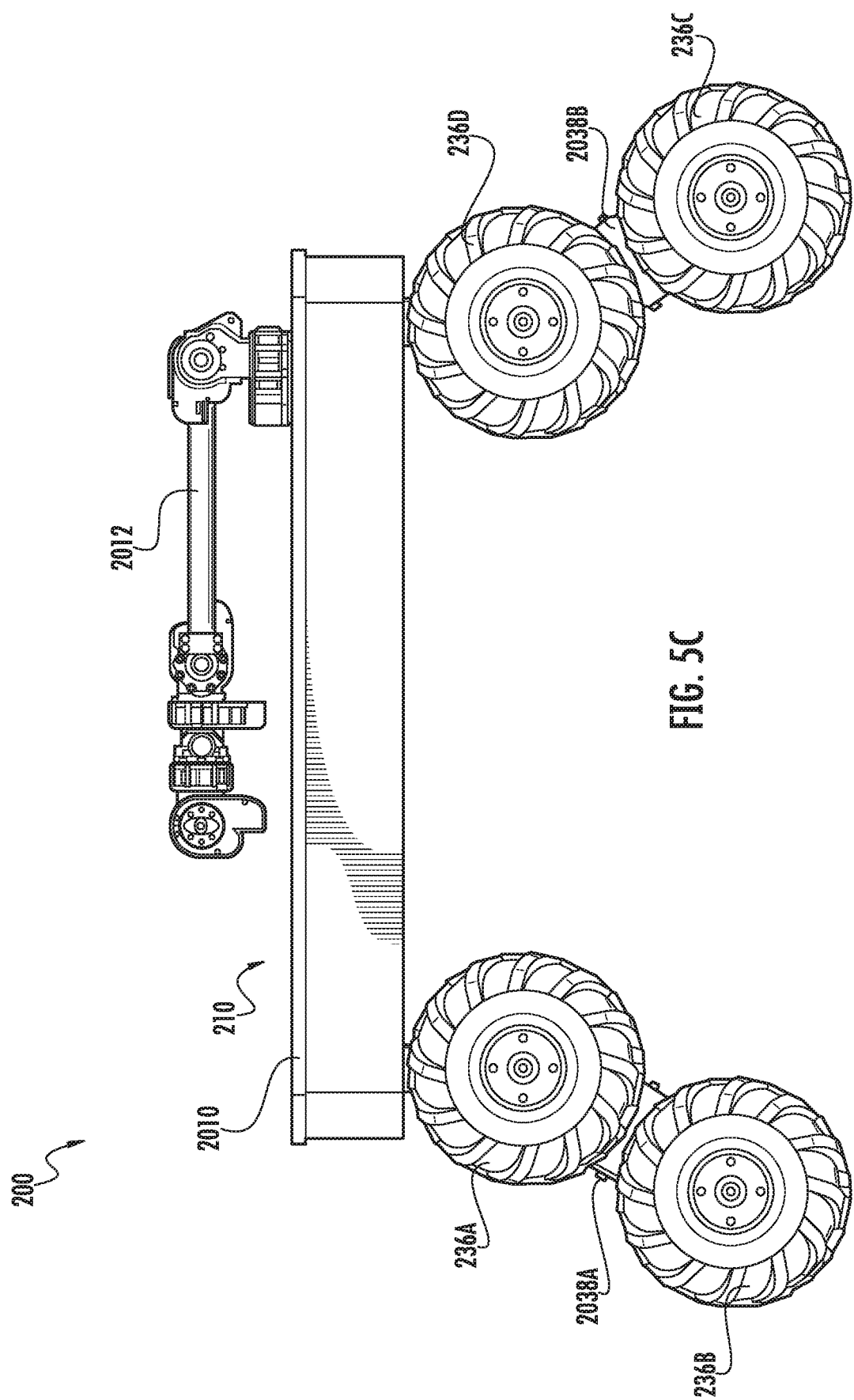
Figure 7B:
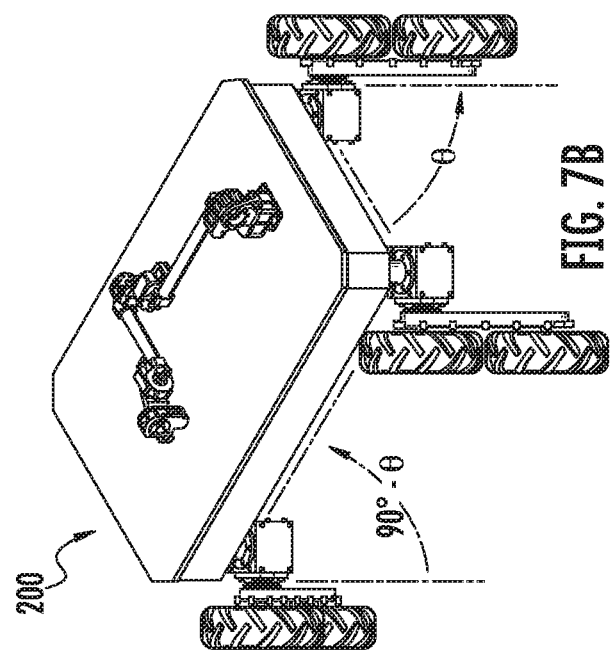
Figure 7D:
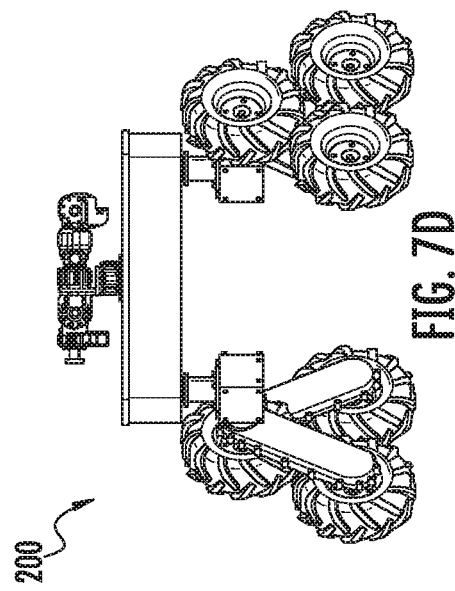
Figure 7A:
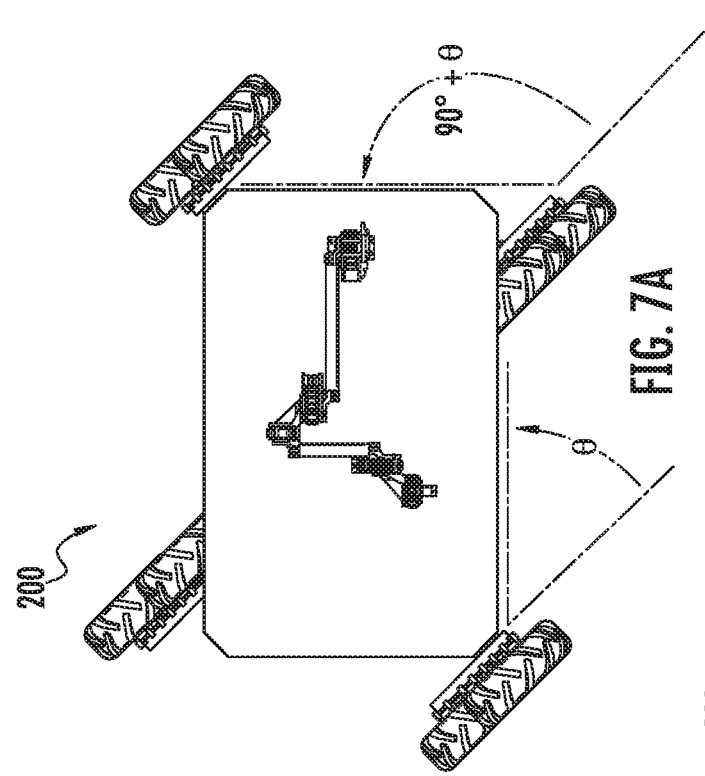
Figure 7C:
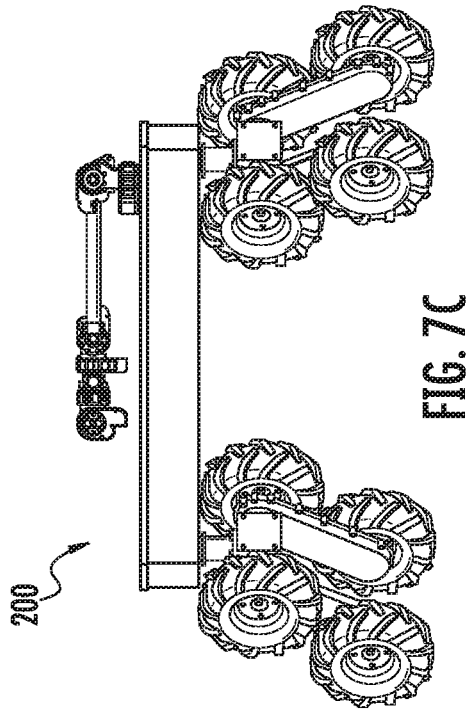
Figure 8:
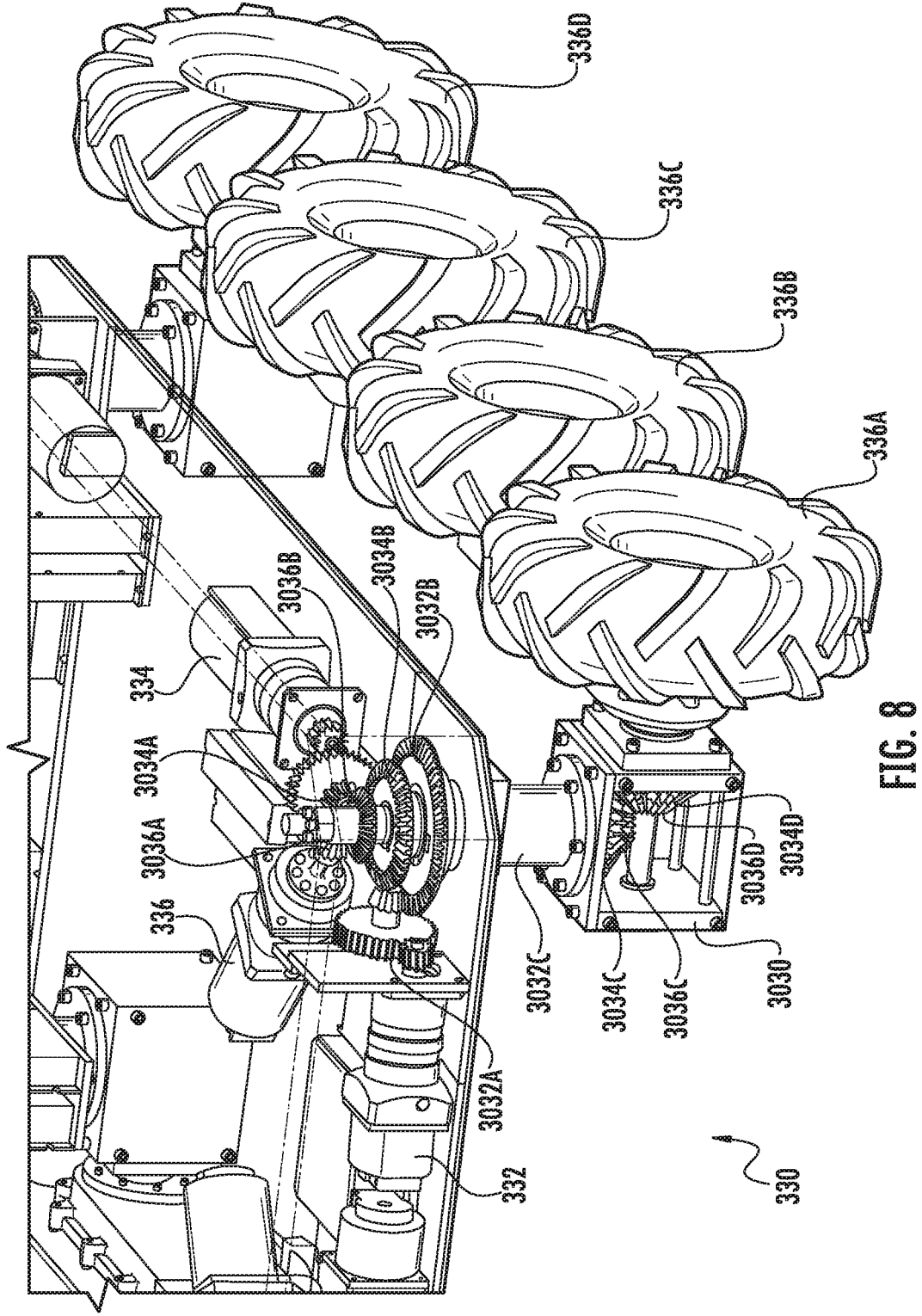
Figure 9:
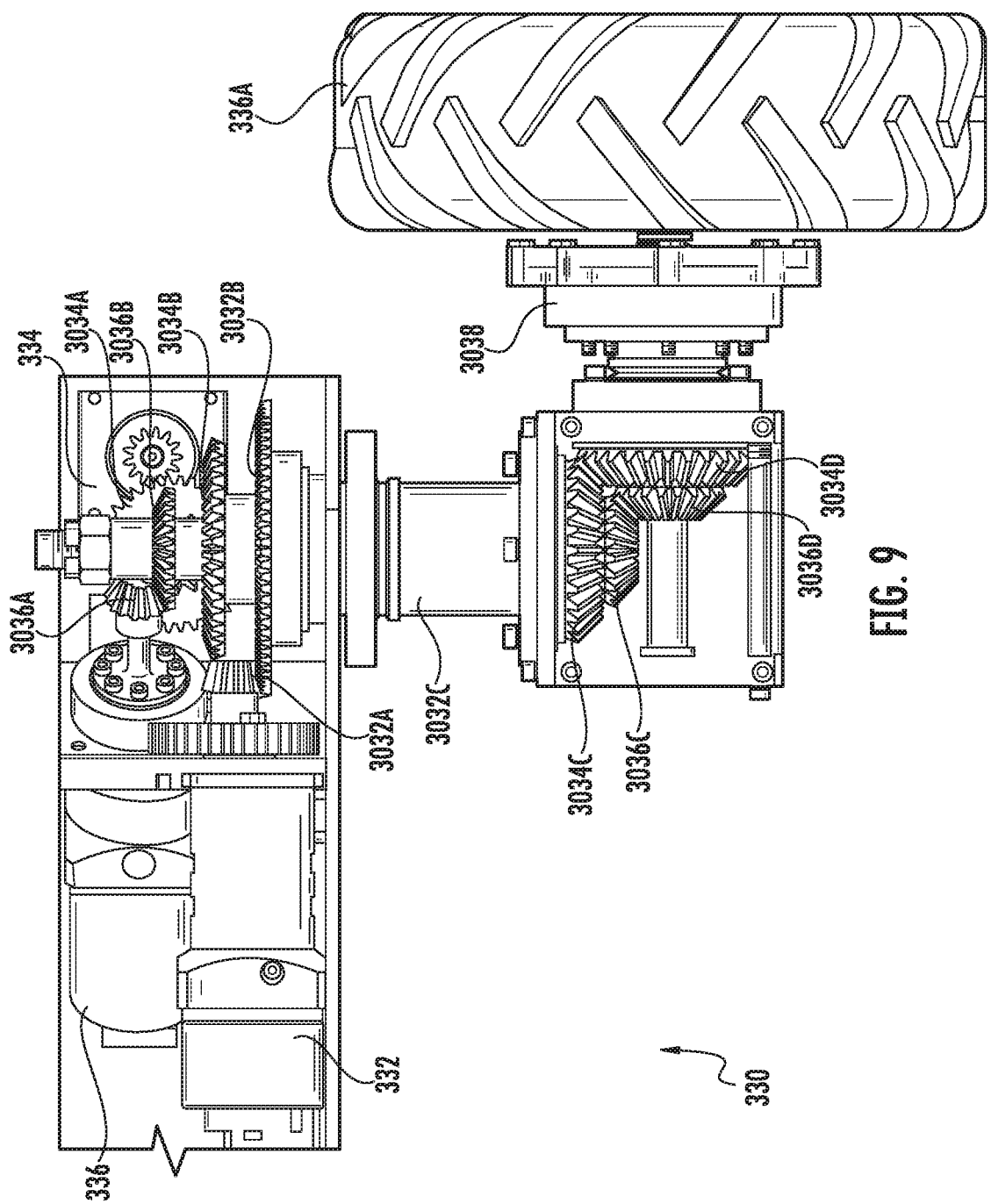
Figure 10:
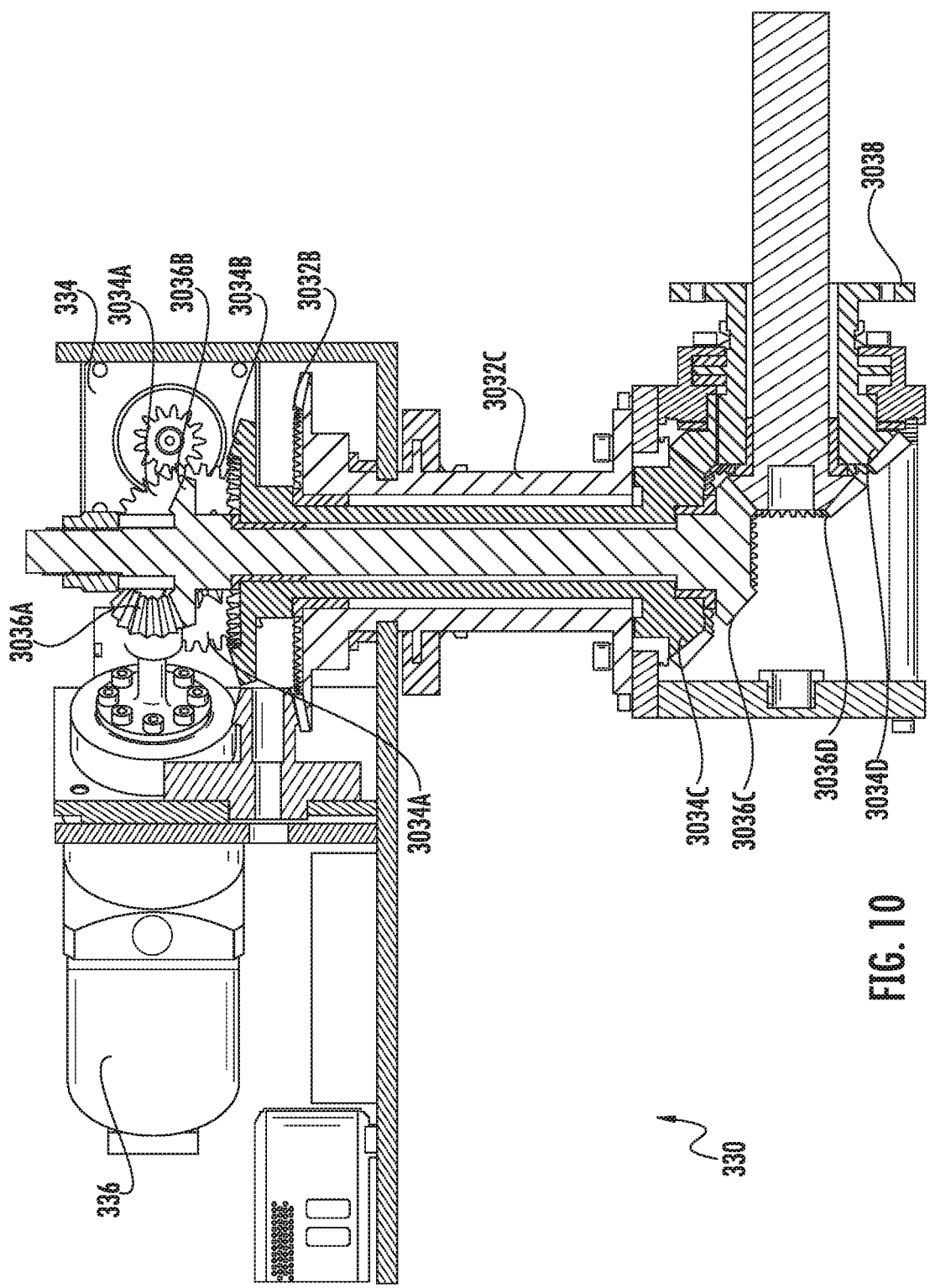

Having thus described certain example embodiments of the present disclosure in general terms, reference will hereinafter be made to the accompanying drawings, which are not necessarily drawn to scale, and wherein:

FIG. 1 illustrates a schematic diagram of a robotic vehicle, according to an embodiment;

FIGS. 2A-2D illustrate a robotic vehicle, according to an embodiment;

FIG. 3 illustrates a partially exploded view of a robotic vehicle, according to an embodiment;

FIGS. 4A-4E illustrate a robotic vehicle configured to have a narrow profile, according to an embodiment;

FIGS. 5A-5D illustrate a robotic vehicle configured to have a taller profile, according to an embodiment;

FIGS. 6A-6D illustrate a robotic vehicle configured to have a tighter turning radius, according to an embodiment;

FIGS. 7A-7D illustrate a robotic vehicle configured to have a taller profile and remain stable while carrying out a tight radius turn, according to an embodiment; and FIGS. 8-10 illustrate drive control systems for a robotic vehicle, according to embodiments.

DETAILED DESCRIPTION

Described generally herein is a robotic system, and more specifically a robotic vehicle including a drive control system with nested bevel gears and a two gearbox configuration which can be placed into a compact conformation for entering confined spaces. In many enclosed or confined spaces, such as tanks, vaults, or tunnels, entry by humans may be overly dangerous, lethal, or even illegal. Robotic vehicles are often utilized to access, survey, and work in environments unfit for human occupation. When designing robotic vehicles for such harsh environments, there is typically a trade-off between ease of access by the robotic vehicle to the environment on the one hand and robustness and maneuverability on the other hand. Therefore, there is a long-felt need in the industry for robotic vehicles that are configurationally suitable to enter confined space environments and also durable and stable enough to traverse and operate in topographically challenging and environmentally harsh conditions.

For harsh working environments, especially confined environments, a smaller robotic vehicle may not have the capability to move heavy materials in the environment, to traverse more rugged terrain, to work expeditiously, and to remain operational under the harsh conditions. For example, simply reducing the dimensions of conventional robotic vehicles often results in a non-linear loss of driving stability, lifting and carrying capacity, durability, and other parameters. In other words, miniaturizing or dimensioning down a conventional robotic vehicle can often reduce the relative usability of the robotic vehicle for the same or similar tasks.

Conversely, for many harsh environments as previously described, for which a robotic vehicle is required to survey and/or conduct repair/maintenance work in the space, for instance, a robotic vehicle must be able to withstand exposure to chemicals, radiation, high temperatures, high air speeds, moisture, must be able to traverse though puddles of water, maneuver over obstacles and uneven ground, and navigate through up to twelve inches of sludge. Such robotic vehicles often must also be able to be deployed through a small (e.g., thirty-inch diameter, forty-inch diameter, fifty-inch diameter, etc.) access port, operate in 35 mile per hour winds and be decontaminated after use.

Previous robotic vehicles for this sort of work and working environment have been limited to optical inspections. Certain confined spaces and spaces having the harshest conditions have not been able to be inspected at all because existing robotic vehicles are not able to navigate around obstacles, remain stable in high winds and temperatures, fit through a small access port, and be decontaminated after use, meaning that inspection with existing robotic vehicles is either not possible or has been cut short when existing robotic vehicles have broken down, gotten stuck, or fallen apart.

Therefore, the inventor has conceived of and diligently reduced to practice a robotic vehicle that solves many of the problems identified with existing robotic vehicles in response to a long-felt need in the industry.

Described generally herein is a robotic vehicle, and more specifically a robotic vehicle including a drive control system with nested bevel gears and a two gearbox configuration which can be placed into a compact conformation for entering confined spaces. In some embodiments, a robotic vehicle can include a main body or substructure configured to house and/or support other components of the robotic vehicle. In some embodiments, the main body can include or support a motor or a plurality of motors operably coupled to a gearbox or a plurality of gearboxes. In some embodiments, the motor or plurality of motors can be rotatably coupled to the gearbox or plurality of gearboxes. In some embodiments, each gearbox of the plurality of gearboxes can include a gear or a plurality of gears. In some embodiments, each gearbox of the plurality of gearboxes can be configured to be rotated about a horizontal axis.

In some embodiments, the robotic vehicle can include a plurality of nested driveshafts operably coupled to the plurality of gearboxes. In some embodiments, each nested driveshaft of the plurality of nested driveshafts can comprise a first driveshaft and a second driveshaft. In some embodiments, the nested driveshafts can comprise the first driveshaft, the second driveshaft disposed within the first driveshaft and configured to rotate freely from the first driveshaft, and a third driveshaft disposed within the second driveshaft and configured to rotate freely from the first driveshaft and the second driveshaft. In some embodiments, a plurality of appendages can be operably coupled to the plurality of gearboxes. In some embodiments, the first driveshaft can be configured to cause and control rotation of one or more of the plurality of gearboxes and the second driveshaft can be configured to cause and control rotation of one or more of the plurality of appendages. In some embodiments, the plurality of appendages can be configured to be rotated along a vertical axis in response to a rotational motion of the first driveshaft. In some embodiments, the plurality of appendages can be configured to be rotated along a horizontal axis in response to the rotational motion of the first driveshaft. In some embodiments, the robotic vehicle can include a plurality of wheels operably coupled to the plurality of appendages. In some embodiments, the plurality of wheels can be configured to rotate about a plurality of wheel axles. In some embodiments, the third driveshaft can be configured to cause and control rotation of one or more of the plurality of wheels. In some embodiments, each wheel of the plurality of wheels can be configured to cause the robotic vehicle to be transported across a contacting surface in response to the rotational motion of the second driveshaft when in contact with the contacting surface.

In some embodiments, the robotic vehicle can include an electronic control system comprising at least one processor and at least one memory device. In some embodiments, the electronic control system configured to operate one or more motors of the plurality of motors to rotate one or more gearboxes of the plurality of gearboxes, operate one or more other motors of the plurality of motors to rotate the first driveshaft such that one or more appendages of the plurality of appendages is rotated along the first axis, and/or operate one or more of the remaining motors of the plurality of motors to rotate the second driveshaft such that one or more wheels of the plurality of wheels is rotated.

A method of operating a robotic vehicle, such as the robotic vehicle described above, including operating one or more motors of the plurality of motors to rotate one or more gearboxes of the plurality of gearboxes until the plurality of appendages are substantially positioned beneath the main body of the robotic vehicle. In some embodiments, the robotic vehicle can include a front side, a back side, a right side and a left side. In some embodiments, a width of the robotic vehicle between the right side and the left side is less than about 500 inches, about 400 inches, about 300 inches, about 200 inches, about 100 inches, about 90 inches, about 80 inches, about 70 inches, about 60 inches, about 50 inches, about 40 inches, about 30 inches, or about 20 inches, inclusive of all values and ranges therebetween. In some embodiments, the width of the robotic vehicle can be between about 10 inches and about 100 inches, about 11 inches and about 95 inches, about 12 inches and about 90 inches, about 13 inches and about 85 inches, about 14 inches and about 80 inches, about 15 inches and about 75 inches, about 16 inches and about 70 inches, about 17 inches and about 65 inches, about 18 inches and about 60 inches, about 19 inches and about 55 inches, about 20 inches and about 50 inches, about 21 inches and about 45 inches, about 22 inches and about 40 inches, about 23 inches and about 35 inches, about 24 inches and about 30 inches, about 10 inches and about 95 inches, about 10 inches and about 90 inches, about 10 inches and about 85 inches, about 10 inches and about 80 inches, about 10 inches and about 75 inches, about 10 inches and about 70 inches, about 10 inches and about 65 inches, about 10 inches and about 60 inches, about 10 inches and about 55 inches, about 10 inches and about 50 inches, about 10 inches and about 45 inches, about 10 inches and about 40 inches, about 10 inches and about 35 inches, about 10 inches and about 30 inches, about 10 inches and about 25 inches, about 10 inches and about 20 inches, about 10 inches and about 15 inches, about 15 inches and about 100 inches, about 20 inches and about 100 inches, about 25 inches and about 100 inches, about 30 inches and about 100 inches, about 35 inches and about 100 inches, about 40 inches and about 100 inches, about 45 inches and about 100 inches, about 50 inches and about 100 inches, about 55 inches and about 100 inches, about 60 inches and about 100 inches, about 65 inches and about 100 inches, about 70 inches and about 100 inches, about 75 inches and about 100 inches, about 80 inches and about 100 inches, about 85 inches and about 100 inches, about 90 inches and about 100 inches, or about 95 inches and about 100 inches, inclusive of all values and subranges therebetween. In some embodiments, the width of the robotic vehicle can be greater than about 10 inches, about 15 inches, about 20 inches, about 25 inches, about 30 inches, about 35 inches, about 40 inches, about 45 inches, about 50 inches, about 55 inches, about 60 inches, about 65 inches, about 70 inches, about 75 inches, about 80 inches, about 85 inches, about 90 inches, about 95 inches, about 100 inches, about 200 inches, about 300 inches, about 400 inches, or about 500 inches, inclusive of all values and ranges therebetween.

In some embodiments, the robotic vehicle can be configured such that one or more motors of the plurality of motors can be operated to rotate one or more gearboxes of the plurality of gearboxes until the plurality of appendages are substantially positioned beneath the main body of the robotic vehicle. In other words, in some embodiments, the robotic vehicle can include appendages, or flippers, that can be rotated until they are tucked underneath or substantially tucked underneath the main body of the robotic vehicle to sufficiently reduce the width of the robotic vehicle such that the robotic vehicle may enter and/or traverse confined spaces.

A method of operating a robotic vehicle, such as the robotic vehicle described herein wherein one or more wheels of the plurality of wheels is coupled to each appendage of the plurality of appendages, can include operating one or more motors of the plurality of motors to rotate the first driveshaft such that one or more appendages of the plurality of appendages is rotated along the first axis until only one wheel of the plurality of wheels coupled to each appendage of the plurality of appendages engages the contacting surface. The method can further include operating one or more other motors of the plurality of motors to rotate the second driveshaft such that the plurality of wheels are rotated about the wheel axles.

A method of operating a robotic vehicle, such as the robotic vehicle described herein, wherein one or more gearboxes of the plurality of gearboxes are positioned beneath one or more other gearboxes of the plurality of gearboxes, the one or more other gearboxes being coupled to one or more driveshafts of the plurality of driveshafts, can include operating one or more motors of the plurality of motors to rotate the one or more other gearboxes such that one or more appendages of the plurality of appendages are rotated about the one or more other gearboxes along the horizontal axis.

In some embodiments, a robotic vehicle can further include a payload control arm coupled to the main body and configured to carry out one or more tasks during operation of the robotic vehicle. In some embodiments, the payload control arm can be configured to grasp, pick up, move, and release objects, move debris during transportation of the robotic vehicle, and the like. In some embodiments, the robotic vehicle can include one or more motors, one or more hydraulic motors, one or more control circuits, one or more actuators, one or more electromechanical drives, or the like.

In some embodiments, the plurality of motors can include a first motor operably coupled to a first driveshaft of the plurality of driveshafts, in a first gearbox of the plurality of gearboxes and a second gearbox of the plurality of gearboxes, the first motor configured to cause controlled rotation of the second gearbox of the plurality of gearboxes along the horizontal axis. In some embodiments, the plurality of motors can further include a second motor operably coupled to a second driveshaft of the plurality of driveshafts, in the first gearbox of the plurality of gearboxes, the second driveshaft nested within the first driveshaft and operably coupled to an appendage, the second motor configured to rotate the appendage along the vertical axis. In some embodiments, the plurality of motors can further include a third motor operably coupled to a third driveshaft of the plurality of driveshafts, in the first gearbox of the plurality of gearboxes, the third driveshaft nested within the second driveshaft and configured to rotate one or more wheels of the plurality of wheels about one or more wheel axles of the plurality of wheel axles.

In some embodiments, a drive control system for a robotic vehicle, such as a robotic vehicle described herein, can include a first motor operably coupled to a first gear in a first gearbox, the first gear operably coupled to an outer driveshaft operably coupled to a second gearbox, the first motor configured to cause controlled rotation of the second gearbox along a horizontal axis with respect to the first gearbox. In some embodiments, the drive control system can further include a second motor operably coupled to a second gear in the first gearbox, the second gear operably coupled to a middle driveshaft nested within the outer driveshaft and operably coupled to a third gear in the second gearbox and an appendage operably coupled to and extending from the second gearbox. The second motor can be configured to rotate or cause rotation of the appendage along a vertical axis or a horizontal axis with respect to the second gearbox. In some embodiments, the drive control system can further include a third motor operably coupled to a fourth gear in the first gearbox, the fourth gear operably coupled to an inner driveshaft nested within the middle driveshaft and coupled to a fifth gear in the second gearbox and a plurality of wheels operably coupled to the appendage, the third motor configured to rotate one or more wheels about one or more wheel axles.

In some embodiments, the drive control system can further include an electronic control system comprising at least one processor and at least one memory device, the electronic control system configured to at least one of (i) operate the first motor to rotate the first gear in the first gearbox and the outer driveshaft such that the second gearbox rotates along the horizontal axis, (ii) operate the second motor to rotate the second gear, the middle driveshaft, and the third gear, such that the appendage is rotated along the vertical axis, and (iii) operate the third motor to rotate the fourth gear, the inner driveshaft, and the fifth gear such that the one or more wheels are rotated about the one or more wheel axles.

In some embodiments, a drive control system for a robotic vehicle can include an outer driveshaft operably coupled to a first gear in a first gearbox at a proximal end and to a second gearbox at a distal end, the second gearbox configured to be rotated about a center point along a horizontal axis. In some embodiments the drive control system can further include a first motor operably coupled to the first gear and configured to cause controlled rotation of the second gearbox along the horizontal axis. In some embodiments, the drive control system can further include a middle driveshaft operably coupled to a second gear in the first gearbox at a proximal end and a third gear in the second gearbox at a distal end. In some embodiments, the drive control system can further include an appendage operably coupled to the third gear in the second gearbox and configured to be rotated about the second gearbox along a vertical axis. In some embodiments, the appendage operably coupled to the third gear in the second gearbox can be configured to be rotated about the second gearbox along a horizontal axis. In some embodiments, the drive control system can further include a second motor operably coupled to the second gear and configured to cause controlled rotation of the appendage along the vertical axis or the horizontal axis. In some embodiments, the drive control system can further include an inner driveshaft operably coupled to a fourth gear in the first gearbox at a proximal end and a fifth gear in the second gearbox at a distal end. In some embodiments, the drive control system can further include a plurality of wheels coupled to the appendage, operably coupled to the fifth gear, and configured to be rotated about a plurality of wheel axles. In some embodiments, the drive control system can further include a third motor operably coupled to the fourth gear and configured to cause controlled rotation of the plurality of wheels about the plurality of wheel axles. In some embodiments, a robotic vehicle can include more than one of such drive control systems. For instance, in some embodiments, the robotic vehicle can include two such drive control systems, three such drive control systems, four such drive control systems, and the like. In some embodiments, the drive control system, or the robotic vehicle comprising one or more such drive control systems can further include an electronic control system comprising at least one processor and at least one memory device. In some embodiments, the electronic control system configured to at least one of (i) operate the first motor to rotate the first gear in the first gearbox and the outer driveshaft such that the second gearbox rotates along the horizontal axis, (ii) operate the second motor to rotate the second gear, the middle driveshaft, and the third gear, such that the appendage is rotated along the vertical axis, and (iii) operate the third motor to rotate the fourth gear, the inner driveshaft, and the fifth gear such that the one or more wheels are rotated about the one or more wheel axles. In some embodiments, the electronic control system or a component thereof can include a computer program product configured to carry out a series of such operations simultaneously. In some embodiments, for instance, the electronic control system can cause the first motor to rotate the second gearbox about the outer driveshaft along a horizontal axis such that a distal end of the appendage is rotated away from the main body to, for instance, angle the one or more wheels away from a current direction of travel of the robotic vehicle at the same time that the electronic control system causes the second motor to rotate the appendage down such that the one or more wheels operably engage the contacting surface (e.g., the ground, a surface of a shaft or conduit, a tank floor, etc.) and the third motor to rotate the one or more wheels about one or more wheel axles such that the robotic vehicle can be caused to change direction and be transported in the second direction.

In some embodiments, a robotic vehicle can include a vehicle body configured to support and house components of the robotic vehicle, a first gearbox disposed at the first corner of the vehicle body, an outer driveshaft operably coupled to a first gear in the first gearbox at a proximal end and to a second gearbox at a distal end, the second gearbox configured to be rotated about a center point along a horizontal axis, a first motor operably coupled to the first gear and configured to cause controlled rotation of the second gearbox along the horizontal axis, a middle driveshaft operably coupled to a second gear in the first gearbox at a proximal end and a third gear in the second gearbox at a distal end, a conveying attachment comprising a proximal end operably coupled to the third gear, a proximal region distal to the proximal end and configured to rotatably engage a first wheel axle, a distal region distal to the proximal region and configured to rotatably engage a second wheel axle, and a distal end. The conveying attachment can be configured to be rotated about the second gearbox along a vertical axis or a horizontal axis. In some embodiments, the robotic vehicle can include a second motor operably coupled to the second gear and configured to cause controlled rotation of the conveying attachment along the vertical axis or the horizontal axis. In some embodiments, the robotic vehicle can include an inner driveshaft operably coupled to a fourth gear in the first gearbox at a proximal end and a fifth gear in the second gearbox at a distal end, a first wheel coupled to the conveying attachment at the first wheel axle and a second wheel coupled to the conveying attachment at the second wheel axle, the first wheel and the second wheel operably coupled to the fifth gear such that rotation of the fifth gear causes the first wheel to rotate about the first wheel axle and the second wheel to rotate about the second wheel axle, and a third motor operably coupled to the fourth gear and configured to cause controlled rotation of the plurality of wheels about the plurality of wheel axles. In some embodiments, the robotic vehicle can include one or more dedicated motor drivers (e.g., motor controllers) to actuate one or more of the motors.

In some embodiments, a range of rotation of the proximal end of the conveying attachment about the second gearbox along the horizontal axis can be greater than about 90°, greater than about 95°, greater than about 100°, greater than about 105°, greater than about 110°, greater than about 115°, greater than about 120°, greater than about 125°, greater than about 130°, greater than about 135°, greater than about 140°, greater than about 145°, greater than about 150°, greater than about 155°, greater than about 160°, greater than about 165°, greater than about 170°, greater than about 175°, greater than about 180°, greater than about 185°, greater than about 190°, greater than about 195°, greater than about 200°, greater than about 205°, greater than about 210°, greater than about 215° greater than about 220°, greater than about 225°, greater than about 230°, greater than about 235° greater than about 240°, greater than about 250°, greater than about 260°, greater than about 265°, greater than about 270°, greater than about 275°, greater than about 280°, greater than about 285° greater than about 290°, greater than about 295°, greater than about 300° greater than about 305°, greater than about 310° greater than about 315° greater than about 320°, greater than about 325°, greater than about 340°, greater than about 345°, greater than about 350° greater than about 355°, or 360°, inclusive of all values and ranges therebetween.

In some embodiments, the robotic vehicle can further include an electronic control system comprising at least one processor and at least one memory device, the electronic control system configured to at least one of (i) operate the first motor to cause controlled rotation of the second gearbox along the horizontal axis, (ii) operate the second motor to cause controlled rotation of the conveying attachment along the vertical axis, and (iii) operate the third motor to cause controlled rotation of the plurality of wheels about the plurality of wheel axles. In some embodiments, the dedicated motor drivers are separate from or integrated with the primary electronics and/or the vehicle computer.

In some embodiments, a method of operating a robotic vehicle can include operating the first motor to cause controlled rotation of the second gearbox along the horizontal axis until the conveying attachment is substantially positioned beneath the vehicle body. In some embodiments, the robotic vehicle can include a front side, a back side, a right side and a left side. In some embodiments, a diameter of the robotic vehicle with respect to a front side view of the robotic vehicle can be less than about 500 inches, about 400 inches, about 300 inches, about 200 inches, about 100 inches, about 90 inches, about 80 inches, about 70 inches, about 60 inches, about 50 inches, about 40 inches, about 30 inches, about 20 inches, or about 10 inches, inclusive of all values and ranges therebetween.

Referring now to FIG. 1, a robotic vehicle 100 can include a main body 110 configured to house or support various components of the robotic vehicle 100. For instance, in some embodiments, the main body 110 can optionally include a platform 1010 and/or a payload control arm 1012. In some embodiments, the robotic vehicle 100 can optionally include an electronics control system 1020 including at least one computer 1022 and at least one memory device 1024. In some embodiments, the robotic vehicle 100 can include a drive control system 130 configured to maneuver the robotic vehicle 100 and to transition the robotic vehicle 100 between two or more conformations or configurations to facilitate the robotic vehicle 100 carrying out difficult tasks in harsh environments, as described herein.

In some embodiments, the drive control system 130 can include a plurality of motors and a plurality of gearboxes including or housing a plurality of gears. For instance, the drive control system 130 can include one or more rotational control motors 132 coupled to rotational control gearing 1032 in a gearbox 1030. In some embodiments, the one or more rotational control motors 132 can cause rotation of the gearbox 1030, for instance about a center point of the rotational control gearing 1032 along a horizontal axis. In some embodiments, the gearbox 1030 can further include additional gearing configured to control other components of the robotic vehicle 100. In some embodiments, the gearbox 1030 can further include tilt control gearing 1034 coupled to one or more tilt control motors 134. In some embodiments, the tilt control gearing 1034 can be further coupled to one or more appendages or conveying attachments such that the one or more tilt control motors 134 can rotate the one or more appendages or conveying attachments about a center point of the tilt control gearing 1034, e.g., along a vertical axis or a horizontal axis. In some embodiments, the appendages or conveying attachments can include a proximal end coupled to the tilt control gearing 1034, a proximal region distal the proximal end and configured to couple with a first wheel of the plurality of wheels 136, a distal region distal the proximal region and configured to couple with a second wheel of the plurality of wheels 136, and a distal end. In some embodiments, the gearbox 1030 can further include drive gearing 1036 coupled to a plurality of wheels 136 and one or more drive motors 138, the plurality of wheels 136 being coupled to one or more appendages or conveying attachments. In some embodiments, the drive motors 138 can be operated to rotatably engage the drive gearing 1036 such that the drive gearing 1036 can cause rotation of the respective wheels 136 at the appendage or conveying attachment. In some embodiments, the robotic vehicle can include one or more dedicated motor drivers (e.g., motor controllers)

to actuate one or more of the motors. In some embodiments, the dedicated motor drivers are separate from or integrated with the primary electronics and/or the vehicle computer.

In some embodiments, the drive control system 130 can be configured to turn the robotic vehicle 100, such as by turning the robotic vehicle 100 in place or by transporting the robotic vehicle 100 across a contacting surface (e.g., the ground, a surface of a shaft or conduit, a tank floor, etc.) about an arbitrary center point. In some embodiments, the drive control system 130 can be configured to raise and/or lower the robotic vehicle 100 or components thereof (e.g., the platform 1010, the payload control arm 1012, or the like). In some embodiments, the drive control system 130 can be configured to transport the robotic vehicle 100 along a route across the contacting surface. In some embodiments, the drive control system 130 can be configured to speed up or slow down the rate at which the robotic vehicle 100 is transported across the contacting surface. The steering angle degree of freedom also allows the robot to strafe left and right without turning its body.

In some embodiments, the drive control system 130 can be configured to change the profile of the robotic vehicle 100, for instance to increase or decrease a height of the robotic vehicle, to widen or narrow a stance of the robotic vehicle 100 (e.g., widen distance between particular wheels of a plurality of wheels) in order to stabilize the robotic vehicle 100, for instance in high winds, and the like. In some embodiments, the drive control system 130 can be configured to discontinue one or more wheels of the plurality of wheels from engaging the contacting surface. In some embodiments, the drive control system 130 can be configured to lift a wheel or an appendage over an obstacle during operation of the robotic system 100.

In some embodiments, the robotic vehicle 100 can include sensors and tools configured to acquire useful data regarding the structural integrity, environmental conditions, repairs required, debris, and the like while inside the confined space. In some embodiments, the robotic vehicle can be configured to collect samples such as atmospheric samples, soil samples, material samples, images, audio recordings, radiological testing results, electromagnetic testing results, spectrophotometric testing results, temperature testing results, wind speed testing results, and the like.

The robotic vehicle 100 can be made of, include, include components made of, or include components including any suitable materials, such as materials that can withstand relatively high temperatures, exposure to radiation and harsh chemicals, and decontamination after exposure to chemicals, radiation, or the like during use. In some embodiments, the robotic vehicle 200 or components thereof can include or be made from materials that act as a shield to radiation. For instance, the use of 304 stainless may, at least partially, shield the electronic components in the main body and other components of the robotic vehicle from radiation in the confined space environment, and has better shielding characteristics than many other materials that could be used.

In some embodiments, the wheels 136 can be configured and dimensioned in order to facilitate transporting the robotic vehicle 100 through thick fluids, over debris, and around obstacles as necessary during use. In some embodiments, the robotic vehicle 100 can be configured to have sufficient mobility to navigate through small or confined spaces such as tunnels, chambers, tanks, underground caverns, vaults, conduits, containment vessels, or the like. In some embodiments, the robotic vehicle 100 can have one or more, e.g., four, appendages (also referred to interchangeably herein as "conveying attachments," "legs," or "flippers"), each appendage having three degrees of freedom. For instance, as shown in FIG. 3, each appendage can be configured to be rotated up and down to adjust an angle of the appendage, such as an angle relative to a main body of the robotic vehicle, an angle relative to the other appendages, an angle relative to a contact surface, or the like. In some embodiments, each appendage can be rotated left and right to adjust the steering angle and allow for precise navigation. In some embodiments, each appendage can comprise one or more wheels, such as one wheel, two wheels, three wheels, or more than three wheels. In some embodiments, the one or more wheels on each flipper can be caused to be rotated about respective wheel axes, which in turn causes translational motion of the robotic vehicle. In some embodiments, the direction of travel of the robotic vehicle can be determined by a degree and direction (e.g., vertical and/or horizontal) of the appendages, for any appendages comprising wheels in contact with the contact surface. In some embodiments, this may allow the robotic vehicle to drive at any flipper angle (for instance, when only one of the wheels of each flipper is actually on the ground). Being able to drive with only one wheel on the ground may also provide redundancy, e.g., in the case of a wheel failure, that wheel can be elevated and not used.

Changing the flipper angle allows the robotic vehicle 100 to change the height of its body, allowing the robotic vehicle to, for instance, drive through puddles without submerging its body. In some embodiments, rotating the flippers outward creates a stable base for when the manipulator arm is working over the side of the robotic vehicle 100. The flipper may also be configured to allow the robotic vehicle to climb over obstacles that are too tall for the wheels to climb if the flippers were not configured to rotate. In the event that the wheels get stuck, e.g., in sludge or a fluid-filled cavity in the contact surface, the flippers can rotate to paddle the robotic vehicle through until the wheels are freed. Having at least two degrees of freedom that propel the robot (the wheels and the flippers) also provides redundancy in the event of a failure of one of the degrees of freedom.

In some embodiments, rotating one or more of the flippers (arms) can result in a steering direction defined by an angle θ between at least some of the flippers and a surface of the platform of the robotic vehicle 100.

Referring now to FIGS. 2A-7D, a robotic vehicle 200 can include a main body 210 configured to house or support various components of the robotic vehicle 200. For instance, in some embodiments, the main body 210 can optionally include a platform 2010 and/or a payload control arm 2012. In some embodiments, the robotic vehicle 200 can optionally include an electronics control system (not shown) including at least one computer (not shown) and at least one memory device (not shown). In some embodiments, the robotic vehicle 200 can include a drive control system 230 configured to maneuver the robotic vehicle 200 and to transition the robotic vehicle 200 between two or more conformations or configurations to facilitate the robotic vehicle 200 carrying out difficult tasks in harsh environments, as described herein. For instance, the drive control system 230 can be transitioned between a first configuration, such as illustrated in FIGS. 2A-2D, a second configuration, such as illustrated in FIGS. 4A-4E, a third configuration, such as illustrated in FIGS. 5A-5D, a fourth configuration, such as illustrated in FIGS. 6A-6D, a fifth configuration, such as illustrated in FIGS. 7A-7D, and/or the like.

In some embodiments, the robotic vehicle 200 can include a plurality of gearboxes 2030 coupled to a plurality of appendages 2038. In some embodiments, the robotic vehicle 200 can include a plurality of wheels 236A-236H coupled to one or more appendages 2038. In some embodiments, the robotic vehicle 200 can include a plurality of nested driveshafts 2032, 2034, 2036 configured, respectively, to rotate the gearbox 2030 about a center point along a first horizontal axis or a first vertical axis, rotate the appendage 2038 about a proximal end along a second horizontal axis or a second vertical axis, and the plurality of wheels 236A-236H about a plurality of wheel axles. As illustrated, the robotic vehicle 200 includes a first appendage 2038A coupled at a proximal end to the main body 210 of the robotic vehicle 200 at a first point, the first appendage 2038A comprising a first wheel 236A coupled to the first appendage 2038A at a proximal region distal to the proximal end. The first appendage 2038A includes a second wheel 236B coupled to the first appendage 2038A at a distal region distal to the proximal region and proximal to a distal end of the first appendage 2038A. The robotic vehicle 200 further includes a second appendage 2038B coupled at a proximal end to the main body 210 of the robotic vehicle 200 at a second point, the second appendage 2038B comprising a first wheel 236C coupled to the second appendage 2038B at a proximal region distal to the proximal end. The second appendage 2038B includes a second wheel 236D coupled to the second appendage 2038B at a distal region distal to the proximal region and proximal to a distal end of the second appendage 2038B. The robotic vehicle 200 further includes a third appendage 2038C coupled at a proximal end to the main body 210 of the robotic vehicle 200 at a third point, the third appendage 2038C comprising a first wheel 236E coupled to the third appendage 2038C at a proximal region distal to the proximal end. The third appendage 2038C includes a second wheel 236F coupled to the third appendage 2038C at a distal region distal to the proximal region and proximal to a distal end of the third appendage 2038C. The robotic vehicle 200 further includes a fourth appendage 2038D coupled at a proximal end to the main body 210 of the robotic vehicle 200 at a fourth point, the fourth appendage 2038D comprising a first wheel 236G coupled to the fourth appendage 2038D at a proximal region distal to the proximal end. The fourth appendage 2038D includes a second wheel 236H coupled to the fourth appendage 2038D at a distal region distal to the proximal region and proximal to a distal end of the fourth appendage 2038D.

In some embodiments, the drive control system 230 can include a plurality of motors (not shown). In some embodiments, the plurality of gearboxes 2030A, 2030B, 2030C, 2030D can include or house a plurality of gears (not shown). For instance, the drive control system 230 can include one or more rotational control motors (not shown) coupled to rotational control gearing (not shown) in a gearbox, such as gearbox 2030A, 2030B, 2030C, 2030D. In some embodiments, the one or more rotational control motors can cause rotation of the gearbox, for instance about a center point of the rotational control gearing along a horizontal axis. In some embodiments, the gearbox can further include additional gearing configured to control other components of the robotic vehicle 200. In some embodiments, the gearbox can further include tilt control gearing (not shown) coupled to one or more tilt control motors (not shown). In some embodiments, the tilt control gearing can be further coupled to one or more appendages or conveying attachments such that the one or more tilt control motors can rotate the one or more appendages or conveying attachments about a center point of the tilt control gearing, e.g., along a vertical axis or a horizontal axis. In some embodiments, an appendage or conveying attachment, such as the first appendage 2038A, can include a proximal end coupled to the tilt control gearing, a proximal region distal the proximal end and configured to couple with a first wheel of the plurality of wheels 236A-236H, a distal region distal the proximal region and configured to couple with a second wheel 236B of the plurality of wheels, and a distal end. In some embodiments, the gearbox 2030A can further include drive gearing coupled to one or more wheels of the plurality of wheels 236A-236H and one or more drive motors, the plurality of wheels 236A-236H being coupled to one or more appendages or conveying attachments. In some embodiments, the drive motors can be operated to rotatably engage the drive gearing such that the drive gearing can cause rotation of the respective wheels at the appendage or conveying attachment.

In some embodiments, the drive control system 230 can be configured to turn the robotic vehicle 200, such as by turning the robotic vehicle 200 in place or by transporting the robotic vehicle 200 across a contacting surface (e.g., the ground, a surface of a shaft or conduit, a tank floor, etc.) about an arbitrary center point. In some embodiments, the drive control system 230 can be configured to raise and/or lower the robotic vehicle 200 or components thereof (e.g., the platform 2010, the payload control arm 2012, or the like). In some embodiments, the drive control system 230 can be configured to transport the robotic vehicle 200 along a route across the contacting surface. In some embodiments, the drive control system 230 can be configured to speed up or slow down the rate at which the robotic vehicle 200 is transported across the contacting surface. The steering angle degree of freedom also allows the robot to strafe left and right without turning its body.

In some embodiments, the drive control system 230 can be configured to change the profile of the robotic vehicle 200, for instance to increase or decrease a height of the robotic vehicle, to widen or narrow a stance of the robotic vehicle 200 (e.g., widen distance between particular wheels of a plurality of wheels) in order to stabilize the robotic vehicle 200, for instance in high winds, and the like. In some embodiments, the drive control system 230 can be configured to discontinue one or more wheels of the plurality of wheels from engaging the contacting surface. In some embodiments, the drive control system 230 can be configured to lift a wheel or an appendage over an obstacle during operation of the robotic vehicle 200.

In some embodiments, the robotic vehicle 200 can include sensors and tools configured to acquire useful data regarding the structural integrity, environmental conditions, repairs required, debris, and the like while inside the confined space. In some embodiments, the robotic vehicle can be configured to collect samples such as atmospheric samples, soil samples, material samples, images, audio recordings, radiological testing results, electromagnetic testing results, spectrophotometric testing results, temperature testing results, wind speed testing results, and the like.

The robotic vehicle 200 can be made of, include, include components made of, or include components including any suitable materials, such as materials that can withstand relatively high temperatures, exposure to radiation and harsh chemicals, and decontamination after exposure to chemicals, radiation, or the like during use. In some embodiments, the wheels 236 can be configured and dimensioned in order to facilitate transporting the robotic vehicle 200 through thick fluids, over debris, and around obstacles as necessary during use. In some embodiments, the robotic vehicle 200 or components thereof can include or be made from materials that act as a shield to radiation. For instance, the use of 304 stainless may, at least partially, shield the electronic components in the main body and other components of the robotic vehicle from radiation in the confined space environment, and has better shielding characteristics than many other materials that could be used.

In some embodiments, the robotic vehicle 200 can be configured to have sufficient mobility to navigate through small or confined spaces such as tunnels, chambers, tanks, underground caverns, vaults, conduits, containment vessels, or the like. In some embodiments, the robotic vehicle 200 can have four appendages or conveying attachments (also called "legs" or "flippers"), each appendage or conveying attachment having three degrees of freedom. For instance, as shown in FIG. 3, each leg can rotate up and down to adjust the flipper angle, as well as left and right to adjust the steering angle and allow for precise navigation. Both wheels on each flipper are driven, which allows the robotic vehicle to drive at any flipper angle (for instance, when only one of the wheels of each flipper is actually on the ground). Being able to drive with only one wheel on the ground also provides redundancy, e.g. in the case of a wheel failure, that wheel can be elevated and not used.

In some embodiments, changing the appendage angle allows the robotic vehicle 200 to change the height of its body, allowing it to drive through puddles without submerging its body, such as is shown in FIGS. 5A-5D and 7A-7D. In some embodiments, rotating the appendage outward creates a stable base for when the manipulator arm is working over the side of the robotic vehicle 200, for instance, as shown in FIGS. 6A-6D and 7A-7D. The appendage may also be configured to allow the robotic vehicle to climb over obstacles that are too tall for the wheels to climb. In the event that the wheels get stuck, e.g., in sludge or a fluid-filled cavity in the contact surface, the appendage can rotate to paddle the robotic vehicle through until the wheels are freed. Having two degrees of freedom that propel the robotic vehicle (the wheels and the flippers) may also provide redundancy in the event of a failure of one of the degrees of freedom.

In some embodiments, rotating one or more of the appendages 2038A, 2038B, 2038C, 2038D can result in a steering direction defined by an angle θ between at least some of the appendages and a surface of the platform of the robotic vehicle 200, for example, as shown in FIGS. 6A-6D and 7A-7D. As shown in FIG. 6A, for instance, in which the robotic vehicle 200 has an initial drive direction, rotating the plurality of gearboxes coupled to the plurality of appendages to form an angle θ between an edge of the main body of the robotic vehicle 200 and the appendages can result in a change in the drive direction to a second drive direction corresponding to the angle θ. In some embodiments, one or more appendages can be rotated to form a first angle with respect to the initial direction of travel of the robotic vehicle 200 and one or more other appendages can be rotated to form a different angle with respect to the initial direction of travel of the robotic vehicle 200. By transitioning different appendages into different conformations or configurations, the robotic vehicle can be rotated without being moved translationally across the contacting surface. In other words, staggered or opposing appendage directions can be achieved in order to spin the robotic vehicle 200 in place. The steering angle degree of freedom may also allow the robotic vehicle to strafe left and right without turning the main body of the robotic vehicle, e.g., without changing the angle, orientation, direction, or the like of the main body of the robotic vehicle.

In some embodiments, the drive control system 230 can include a plurality of gears coupled to a plurality of nested driveshafts, e.g., such as bevel gears coupled to the nested hollow driveshafts 2032, 2034, 2036, the plurality of nested driveshafts 2032, 2034, 2036 being operably coupled to the plurality of gearboxes. In some embodiments, the plurality of nested driveshafts 2032, 2034, 2036 can comprise a first driveshaft 2032 configured to rotate a gearbox and dimensioned and configured define an inner volume in which the second driveshaft 2034 and the third driveshaft 2036 can be disposed, each of the driveshafts 2032, 2034, 2036 configured to spin freely of the others. In some embodiments, a plurality of appendages can be operably coupled to the plurality of gearboxes. In some embodiments, the plurality of appendages can be configured to be rotated about the second gearbox in response to a rotational motion of the second driveshaft 2036. In some embodiments, the robotic vehicle can include a plurality of wheels 236A, 236B operably coupled to the plurality of appendages. In some embodiments, the plurality of wheels 236A, 236B can be configured to rotate about a plurality of wheel axles. In some embodiments, the third driveshaft 2036 can be configured to rotate or cause rotation of one or more of the plurality of wheels 236A, 236B. In some embodiments, each of the wheels 236A, 236B can be configured to cause the robotic vehicle to be transported across a contacting surface in response to the rotational motion of the third driveshaft 2036 when in contact with the contacting surface.

In some embodiments, the robotic vehicle can include an electronic control system comprising at least one processor and at least one memory device. In some embodiments, the electronic control system configured to operate one or more motors of the plurality of motors to rotate the first driveshaft 2032 to rotate one or more gearboxes of the plurality of gearboxes, operate one or more other motors of the plurality of motors to rotate the second driveshaft 2034 such that one or more appendages of the plurality of appendages is rotated along the first axis, and/or operate one or more of the remaining motors of the plurality of motors to rotate the third driveshaft 2036 such that one or more wheels of the plurality of wheels is rotated.

A method of operating a robotic vehicle, such as the robotic vehicle described above, including operating one or more motors of the plurality of motors to rotate one or more gearboxes of the plurality of gearboxes until the plurality of appendages are substantially positioned beneath the main body of the robotic vehicle. In some embodiments, the robotic vehicle can include a front side, a back side, a right side and a left side. In some embodiments, a width of the robotic vehicle between the right side and the left side is less than about 500 inches, about 400 inches, about 300 inches, about 200 inches, about 100 inches, about 90 inches, about 80 inches, about 70 inches, about 60 inches, about 50 inches, about 40 inches, about 30 inches, or about 20 inches, inclusive of all values and ranges therebetween. In some embodiments, the width of the robotic vehicle can be between about 10 inches and about 100 inches, about 11 inches and about 95 inches, about 12 inches and about 90 inches, about 13 inches and about 85 inches, about 14 inches and about 80 inches, about 15 inches and about 75 inches, about 16 inches and about 70 inches, about 17 inches and about 65 inches, about 18 inches and about 60 inches, about 19 inches and about 55 inches, about 20 inches and about 50 inches, about 21 inches and about 45 inches, about 22 inches and about 40 inches, about 23 inches and about 35 inches, about 24 inches and about 30 inches, about 10 inches and about 95 inches, about 10 inches and about 90 inches, about 10 inches and about 85 inches, about 10 inches and about 80 inches, about 10 inches and about 75 inches, about 10 inches and about 70 inches, about 10 inches and about 65 inches, about 10 inches and about 60 inches, about 10 inches and about 55 inches, about 10 inches and about 50 inches, about 10 inches and about 45 inches, about 10 inches and about 40 inches, about 10 inches and about 35 inches, about 10 inches and about 30 inches, about 10 inches and about 25 inches, about 10 inches and about 20 inches, about 10 inches and about 15 inches, about 15 inches and about 100 inches, about 20 inches and about 100 inches, about 25 inches and about 100 inches, about 30 inches and about 100 inches, about 35 inches and about 100 inches, about 40 inches and about 100 inches, about 45 inches and about 100 inches, about 50 inches and about 100 inches, about 55 inches and about 100 inches, about 60 inches and about 100 inches, about 65 inches and about 100 inches, about 70 inches and about 100 inches, about 75 inches and about 100 inches, about 80 inches and about 100 inches, about 85 inches and about 100 inches, about 90 inches and about 100 inches, or about 95 inches and about 100 inches, inclusive of all values and subranges therebetween. In some embodiments, the width of the robotic vehicle can be greater than about 10 inches, about 15 inches, about 20 inches, about 25 inches, about 30 inches, about 35 inches, about 40 inches, about 45 inches, about 50 inches, about 55 inches, about 60 inches, about 65 inches, about 70 inches, about 75 inches, about 80 inches, about 85 inches, about 90 inches, about 95 inches, about 100 inches, about 200 inches, about 300 inches, about 400 inches, or about 500 inches, inclusive of all values and ranges therebetween.

In some embodiments, the robotic vehicle can be configured such that one or more motors of the plurality of motors can be operated to rotate one or more gearboxes of the plurality of gearboxes until the plurality of appendages are substantially positioned beneath the main body of the robotic vehicle. In other words, in some embodiments, the robotic vehicle can include appendages, or flippers, that can be rotated until they are tucked underneath the main body of the robotic vehicle to sufficiently reduce the width of the robotic vehicle such that it may enter and/or traverse confined spaces.

A method of operating a robotic vehicle, such as the robotic vehicle described herein wherein one or more wheels of the plurality of wheels is coupled to each appendage of the plurality of appendages, can include operating one or more motors of the plurality of motors to rotate the second driveshaft 2034 such that one or more appendages of the plurality of appendages is rotated along the first axis until only one wheel of the plurality of wheels coupled to each appendage of the plurality of appendages engages the contacting surface. The method can further include operating one or more other motors of the plurality of motors to rotate the third driveshaft 2036 such that the plurality of wheels are rotated about the wheel axles.

A method of operating a robotic vehicle, such as the robotic vehicle described herein, wherein one or more gearboxes of the plurality of gearboxes are positioned beneath one or more other gearboxes of the plurality of gearboxes, the one or more other gearboxes being coupled to one or more driveshafts of the plurality of driveshafts, can include operating one or more motors of the plurality of motors to rotate the one or more other gearboxes such that one or more appendages of the plurality of appendages are rotated about the one or more other gearboxes along the horizontal axis.

In some embodiments, a robotic vehicle can further include a payload control arm coupled to the main body and configured to carry out one or more tasks during operation of the robotic vehicle. In some embodiments, the payload control arm can be configured to grasp, pick up, move, and release objects, move debris during transportation of the robotic vehicle, and the like. In some embodiments, the robotic vehicle can include one or more motors, one or more hydraulic motors, one or more control circuits, one or more actuators, one or more electromechanical drives, or the like.

In some embodiments, the plurality of motors can include a first motor operably coupled to a first driveshaft of the plurality of driveshafts, in a first gearbox of the plurality of gearboxes and a second gearbox of the plurality of gearboxes, the first motor configured to rotate a first driveshaft to cause controlled rotation of the second gearbox of the plurality of gearboxes. In some embodiments, the plurality of motors can further include a second motor operably coupled to a second driveshaft of the plurality of driveshafts, in the first gearbox of the plurality of gearboxes, the second driveshaft nested within the first driveshaft and operably coupled to an appendage, the second motor configured to rotate the appendage along the vertical axis. In some embodiments, the plurality of motors can further include a third motor operably coupled to a third driveshaft of the plurality of driveshafts, in the first gearbox of the plurality of gearboxes, the third driveshaft nested within the second driveshaft and configured to rotate one or more wheels of the plurality of wheels about one or more wheel axles of the plurality of wheel axles.

In some embodiments, a drive control system for a robotic vehicle, such as a robotic vehicle described herein, can include a first motor operably coupled to a first gear in a first gearbox, the first gear operably coupled to an outer driveshaft operably coupled to a second gearbox, the first motor configured to cause controlled rotation of the second gearbox along a horizontal axis with respect to the first gearbox. In some embodiments, the drive control system can further include a second motor operably coupled to a second gear in the first gearbox, the second gear operably coupled to a middle driveshaft nested within the outer driveshaft and operably coupled to a third gear in the second gearbox and an appendage operably coupled to and extending from the second gearbox. The second motor can be configured to rotate the appendage along a vertical axis or a horizontal axis with respect to the second gearbox or with respect to a center point of the appendage. In some embodiments, the drive control system can further include a third motor operably coupled to a fourth gear in the first gearbox, the fourth gear operably coupled to an inner driveshaft nested within the middle driveshaft and coupled to a fifth gear in the second gearbox and a plurality of wheels operably coupled to the appendage, the third motor configured to rotate one or more wheels about one or more wheel axles.

In some embodiments, the drive control system can further include an electronic control system comprising at least one processor and at least one memory device, the electronic control system configured to at least one of (i) operate the first motor to rotate the first gear in the first gearbox and the outer driveshaft such that the second gearbox rotates along the horizontal axis, (ii) operate the second motor to rotate the second gear, the middle driveshaft, and the third gear, such that the appendage is rotated along the vertical axis, and (iii) operate the third motor to rotate the fourth gear, the inner driveshaft, and the fifth gear such that the one or more wheels are rotated about the one or more wheel axles.

In some embodiments, a drive control system for a robotic vehicle can include an outer driveshaft operably coupled to a first gear in a first gearbox at a proximal end and to a second gearbox at a distal end, the second gearbox configured to be rotated about a center point along a horizontal axis. In some embodiments the drive control system can further include a first motor operably coupled to the first gear and configured to cause controlled rotation of the second gearbox along the horizontal axis. In some embodiments, the drive control system can further include a middle driveshaft operably coupled to a second gear in the first gearbox at a proximal end and a third gear in the second gearbox at a distal end. In some embodiments, the drive control system can further include an appendage operably coupled to the third gear in the second gearbox and configured to be rotated about the second gearbox, e.g., along a vertical axis or a horizontal axis. In some embodiments, the drive control system can further include a second motor operably coupled to the second gear and configured to cause controlled rotation of the appendage along the vertical axis. In some embodiments, the drive control system can further include an inner driveshaft operably coupled to a fourth gear in the first gearbox at a proximal end and a fifth gear in the second gearbox at a distal end. In some embodiments, the drive control system can further include a plurality of wheels coupled to the appendage, operably coupled to the fifth gear, and configured to be rotated about a plurality of wheel axles. In some embodiments, the drive control system can further include a third motor operably coupled to the fourth gear and configured to cause controlled rotation of the plurality of wheels about the plurality of wheel axles. In some embodiments, a robotic vehicle can include more than one of such drive control systems. For instance, in some embodiments, the robotic vehicle can include two such drive control systems, three such drive control systems, four such drive control systems, and the like. In some embodiments, the drive control system, or the robotic vehicle comprising one or more such drive control systems can further include an electronic control system comprising at least one processor and at least one memory device. In some embodiments, the electronic control system configured to at least one of (i) operate the first motor to rotate the first gear in the first gearbox and the outer driveshaft such that the second gearbox rotates along the horizontal axis, (ii) operate the second motor to rotate the second gear, the middle driveshaft, and the third gear, such that the appendage is rotated along the vertical axis, and (iii) operate the third motor to rotate the fourth gear, the inner driveshaft, and the fifth gear such that the one or more wheels are rotated about the one or more wheel axles. In some embodiments, the electronic control system or a component thereof can include a computer program product configured to carry out a series of such operations simultaneously. In some embodiments, for instance, the electronic control system can cause the first motor to rotate the second gearbox about the outer driveshaft along a horizontal axis such that a distal end of the appendage is rotated away from the main body to, for instance, angle the one or more wheels away from a current direction of travel of the robotic vehicle at the same time that the electronic control system causes the second motor to rotate the appendage down such that the one or more wheels operably engage the contacting surface (e.g., the ground, a surface of a shaft or conduit, a tank floor, etc.) and the third motor to rotate the one or more wheels about one or more wheel axles such that the robotic vehicle can be caused to change direction and be transported in the second direction.

In some embodiments, a robotic vehicle can include a vehicle body configured to support and house components of the robotic vehicle. In some embodiments, a first gearbox can be disposed at the first corner of the vehicle body. In some embodiments, an outer driveshaft can be operably coupled to a first gear in the first gearbox at a proximal end and to a second gearbox at a distal end, the second gearbox configured to be rotated about a center point, e.g., along a horizontal axis or a vertical axis. In some embodiments, the robotic vehicle can include a first motor operably coupled to the first gear and configured to cause controlled rotation of the second gearbox. In some embodiments, the robotic vehicle can include a middle driveshaft operably coupled to a second gear in the first gearbox at a proximal end and a third gear in the second gearbox at a distal end. In some embodiments, the robotic vehicle can include a conveying attachment comprising a proximal end operably coupled to the third gear, a proximal region distal to the proximal end and configured to rotatably engage a first wheel axle, a distal region distal to the proximal region and configured to rotatably engage a second wheel axle, and a distal end. In some embodiments, the conveying attachment can be configured to be rotated about the second gearbox, e.g., along a vertical axis or a horizontal axis. In some embodiments, the robotic vehicle can include a second motor operably coupled to the second gear and configured to cause controlled rotation of the conveying attachment. In some embodiments, the robotic vehicle can include an inner driveshaft operably coupled to a fourth gear in the first gearbox at a proximal end and a fifth gear in the second gearbox at a distal end. In some embodiments, the robotic vehicle can include a first wheel coupled to the conveying attachment at the first wheel axle and a second wheel coupled to the conveying attachment at the second wheel axle, the first wheel and the second wheel operably coupled to the fifth gear such that rotation of the fifth gear causes the first wheel to rotate about the first wheel axle and the second wheel to rotate about the second wheel axle. In some embodiments, the robotic vehicle can include a third motor operably coupled to the fourth gear and configured to cause controlled rotation of the plurality of wheels about the plurality of wheel axles. In some embodiments, a range of rotation of the proximal end of the conveying attachment about the second gearbox, e.g., along the horizontal axis, can be greater than about 90°, greater than about 95°, greater than about 100°, greater than about 105°, greater than about 110°, greater than about 115°, greater than about 120°, greater than about 125°, greater than about 130°, greater than about 135°, greater than about 140°, greater than about 145°, greater than about 150°, greater than about 155°, greater than about 160°, greater than about 165°, greater than about 170°, greater than about 175°, greater than about 180°, greater than about 185°, greater than about 190°, greater than about 195°, greater than about 200°, greater than about 205°, greater than about 210°, greater than about 215°, greater than about 220°, greater than about 225°, greater than about 230°, greater than about 235°, greater than about 240°, greater than about 250°, greater than about 260°, greater than about 265°, greater than about 270°, greater than about 275°, greater than about 280°, greater than about 285°, greater than about 290°, greater than about 295°, greater than about 300°, greater than about 305°, greater than about 310° greater than about 315° greater than about 320°, greater than about 325°, greater than about 340°, greater than about 345°, greater than about 350°, greater than about 355°, or 360°, inclusive of all values and ranges therebetween.

In some embodiments, a larger range of rotation of the conveying attachment (appendage) about the second gearbox can result in a larger steering angle range. A greater steering angle range may allow for more precise navigation in confined spaces, and may be critical for achieving the relatively small profile dimensions necessary to be deployed into the confined space, e.g., through an access hatch, door, entryway, orifice, or the like. Access into many confined spaces requires traversing through a narrow (e.g., twenty-inch, thirty-inch, forty-inch, fifty-inch, sixty-inch, etc.) diameter hatch into an enclosed work environment. During deployment, the steering angle of the robotic vehicles 100 and 200 described herein may be adjusted so that the conveying attachments are rotated about the gearboxes and drawn up underneath, or rotated to be positioned substantially beneath, the main body of the robotic vehicle, allowing the robotic vehicle to fit through the access port before the conveying attachments (appendages) are rotated about the gearboxes to place the robotic vehicle into a wider, more stable configuration for use within the confined space.

Referring now to FIGS. 8-10, a robotic system, such as robotic vehicle 100 or 200, can include a drive control system such as the drive control system 330 illustrated. In some embodiments, the drive control system 330 can include a first motor 332, a second motor 334, and a third motor 336, and a driveshaft configuration comprising one or more nested gears. For instance, the first motor 332 can be operably coupled to a first steering gear 3032A, the first steering gear 3032A operably coupled to a second steering gear 3032B coupled to an outer driveshaft 3032C of a nested driveshaft. In some embodiments, the first steering gear 3032A can include a main shaft, a bevel gear mounted on the main shaft and a spur gear mounted on the main shaft, the bevel gear and/or the spur gear configured to translate rotational motion of a drive shaft of the first motor 332 to rotation of the main shaft. In some embodiments, the drive control system 330 can be configured such that, as the first motor 332 exerts rotational control over the first steering gear 3032A, the first steering gear 3032A rotates the second steering gear 3032B, which in turn rotates the outer driveshaft 3032C such that the second gearbox 3030 is rotated in a corresponding direction. The second motor 334 can be operably coupled to a first appendage control gear 3034A, the first appendage control gear 3034A operably coupled to a second appendage control gear 3034B, the second appendage control gear 3034B operably coupled to a third appendage control gear 3034C, the third appendage control gear 3034C operably coupled to a fourth appendage control gear 3034D, the fourth appendage control gear 3034D operably coupled to the appendage. In some embodiments, the drive control system 330 can be configured such that, as the second motor 334 exerts rotational control over the first appendage control gear 3034A, the second appendage control gear 3034B, third appendage control gear 3034C, and fourth appendage control gear 3034D are rotated in turn, causing the appendage to rotate about a proximal end along the vertical axis, raising and lowering at least one of the wheels 336A, 336B coupled to the appendage. The third motor 336 can be operably coupled to a second wheel control gear 3036B, the second wheel control gear 3036B operably coupled to a third wheel control gear 3036C, the third wheel control gear 3036C operably coupled to a fourth wheel control gear 3036D, the fourth wheel control gear 3036D operably coupled to the wheels 334A, 336B. In some embodiments, the drive control system 330 can be configured such that, as the third motor 336 exerts rotational control over the first wheel control gear 3036A, the second wheel control gear 3036B, third wheel control gear 3036C, and fourth wheel control gear 3036D are rotated in turn, causing the wheels 336A, 336B to rotate about respective wheel axles, causing the robotic vehicle to be moved across the contacting surface.

According to some embodiments, such as the robotic vehicle 200, the robotic vehicle 200 has three degrees of freedom with respect to rotation of the second gearbox, rotation of the conveying attachment, and rotation of the plurality of wheels.

In some embodiments, each degree of freedom, i.e., horizontal second gearbox rotation, vertical conveying attachment rotation, and wheel rotation about the wheel axle can be actuated by an electronic motor, e.g., a separate 24V brushless DC motor. In some embodiments, the motors for the conveying attachment angle and steering angle are mounted to planetary gearboxes with a reduction ratio, such as a 50:1 reduction ratio. In some embodiments, the reduction ratio can be between about 2:1 and about 100:1, about 10:1 to about 90:1, about 20:1 to about 80:1, about 30:1 to about 70:1, or about 40:1 to about 60:1, inclusive of all ranges and values therebetween. In some embodiments, the motors for the wheels can be mounted to harmonic drives with a reduction ratio, such as a 45:1 reduction ratio. In some embodiments, because there is one motor per degree of freedom, each degree of freedom can be actuated independently of the others. According to some embodiments, some or all of the motors, motor drivers, and supporting electronics can be packaged in the main body of the robotic vehicle, reducing the likelihood of damage or operational failure, e.g., due to submergence of such components in water. The motion from the motors to the moving parts can be transmitted through three vertical concentric shafts with nested bevel gears at each end (such as illustrated in the partial cut-away of the nested gears in FIG. 10). According to some embodiments, a set of nested bevel gears at the base of each flipper redirects the axis of rotation for the wheels and the flipper angle. In some embodiments, the wheels can be connected with a chain or timing belt so that both wheels are driven at all times. Conversely, in other embodiments, the wheels can be replaced by one or more articulating legs, one or more treads, one or more other conveyance devices, or combinations thereof. The design torques and gear reductions for each degree of freedom, according to a particular embodiment, are listed in Table 1.

TABLE 1

Actuation Torques

| Degree of Freedom | Gear Reduction | Torque (N · m) |
|---|---|---|
| Flipper Angle | 352:1 | 152 |
| Steering Angle | 800:1 | 104 |
| Wheel | 83:1 | 19 |

In some embodiments, exposed components and surfaces can include or be made from a hardened metal or metal alloy, such as 304L stainless steel, in order to minimize corrosion from contact with heat and/or harsh chemicals in the confined space. Alternatively or additionally, the structural components can be made of aluminum skeletons wrapped in protective sheets of 304L stainless steel. The main body and wheel bars can be sealed or substantially sealed so as to be watertight, and the driveshafts can include driveshaft seals to prevent water or harsh chemicals from entering the driveshafts, gearing, gear housing, or the like. In some embodiments, external fasteners can be made from 18-8 stainless steel.

In some embodiments, the robotic vehicle can be designed to carry a payload of sensors and tools that will allow a user to gather a large amount of useful data about the confined space. A manipulator arm can be attached to the top of the robot, such as the platform, that is capable of using tools such as sample collectors and non-destructive concrete thickness sensors. A miniature inspection unit can also or alternatively be housed on top of the robotic vehicle. In some embodiments, the robotic vehicle can be specifically configured and dimensioned to operate in an air duct, tunnel, conduit, channel, tank, vessel, or the like. In some embodiments, the robotic vehicle can be deployed into the confined space with the help of the manipulator arm. In some embodiments, the robotic vehicle can include the manipulator arm in order to operate a camera, video camera, infrared radiation camera, spectroscope, chemical analysis equipment, air sampling equipment, radiological testing equipment, or the like. In some embodiments, a sensor tree can be mounted on the robotic vehicle, the sensor tree comprising one or more high-definition cameras and at least one LIDAR sensor that can be used to map the confined space and for obstacle detection in conjunction with the high-definition cameras. Such tasks are often quite difficult or impossible to carry out using the larger conventional robotic vehicles due to a lack of accessibility to and maneuverability within the confined space. Furthermore, conventional robotic vehicles typically do not include self-contained, non-exposed gearing and motor systems, airtight and/or watertight housings and body structure, and exceptionally maneuverable conveying appendages. These and other advantages allow the robotic vehicles described herein to access previously inaccessible confined spaces, carry out mission-critical tasks in harsh environments, and return to be properly decontaminated, which marks a significant improvement over conventional robotic vehicles used for similar task, solving a long-felt need in the industry for a robotic vehicle that is durable enough and pilotable through such harsh confined spaces.

It should be understood that the examples and embodiments described herein are for illustrative purposes only and that various modifications or changes in light thereof will be suggested to persons skilled in the art and are to be included within the spirit and purview of this application.

In order to address various issues and advance the art, the entirety of this application (including the Title, Headings, Background, Summary, Brief Description of the Drawings, Detailed Description, Abstract, Figures, any Appendices, and otherwise) shows, by way of illustration, various embodiments in which the disclosed innovations may be practiced. The advantages and features of the application are of a representative sample of embodiments only, and are not exhaustive and/or exclusive. They are presented to assist in understanding and teach the disclosed principles.

It should be understood that they are not representative of all disclosed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various inventive concepts may be embodied as one or more methods, systems, apparatuses, and/or kits, of which at least one example has been provided. The acts performed as part of the method may be ordered in any suitable way. The configuration and ordering of constituent parts of a system or apparatus as described may be changed and/or whole constituent parts may be removed, according to any suitable manner in which the system or apparatus can be comprised. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations. Applicant reserves all rights in any and all innovations including the right to claim such innovations, file additional applications, nonprovisional applications, design applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments, claims or limitations on equivalents to the embodiments and/or claims. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Unless otherwise indicated, all numbers expressing quantities of equipment, operating conditions, and so forth used in the specification and claims are to be understood as being modified in all instances by the term "about". Accordingly, unless indicated to the contrary, the numerical parameters set forth in the present specification and attached claims are approximations that can vary depending upon the desired properties sought to be obtained by the present application. Generally, the term "about," as used herein when referring to a measurable value such as an amount of weight, time, volume, ratio, temperature, etc., is meant to encompass±10% of the stated value. For example, a value of "1,000," which would be construed from above as meaning "about 1,000," indicates a range of values from 900 to 1,100, inclusive of all values and ranges therebetween. As another example, a value of "about 1,000" should be taken to indicate any single value or sub-range of values from 900 to 1,100, inclusive of the values 900 and/or 1,100. As such, if a value of "about 1,000" is disclosed or claimed, this disclosure or claim element includes, for example, the value of 900, the value of 900.0000000000001, the value of 900.1, the value of 901, . . . the value of 1,000, . . . the value of 1,099.9999999, the value of 1,100, and all values, ranges, sub-ranges, therebetween including values interstitial to adjacent integers or whole numbers, to any decimal place.

Generally, the term "substantially," as used herein when referring to a measurable value, is meant to encompass±10% of the stated value. Generally, the term "substantially," as used herein with regard to a discrete position or orientation of a piece of equipment or component of a robotic vehicle or subcomponent thereof, is meant to encompass the discrete position±10% of the discrete position. Generally, the term "substantially," as used herein with regard to a location of a piece of equipment or component of a robotic vehicle or subcomponent thereof along a total range of travel of that equipment, component, or subcomponent, is meant to encompass±10% of the location of the equipment, component, or subcomponent with regard to the total range of travel of that piece of equipment, component, or subcomponent, including translational travel, rotational travel, and extending travel in any direction, orientation, or configuration. As such, the use of the phrase "substantially disposed within a container" would be construed from above as meaning that greater than or equal to 90% of the subject element is disposed within the container. Likewise, the use of the phrase "substantially positioned beneath the vehicle body" would be construed from above as meaning that greater than or equal to 90% of the subject element is positioned beneath the vehicle body.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

All examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations that are disclosed and may not explicitly recited. As such, it should be understood that advantages, embodiments, examples, functional, features, logical, operational, organizational, structural, topological, and/or other aspects of the disclosure are not to be considered limitations on the disclosure as defined by the embodiments, examples, claims or limitations on equivalents to the embodiments, examples, and/or claims.

The invention claimed is:

1. A robotic vehicle comprising:
   a main body comprising a plurality of motors operably coupled to a plurality of gearboxes, each gearbox of the plurality of gearboxes configured to be rotated;
   a plurality of nested driveshafts operably coupled to the plurality of gearboxes, each nested driveshaft of the plurality of nested driveshafts comprising a first driveshaft and a second driveshaft;
   a plurality of appendages operably coupled to the plurality of gearboxes, the plurality of appendages configured to be rotated in response to a rotational motion of the first driveshaft; and
   a plurality of wheels operably coupled to the plurality of appendages and configured to rotate about a plurality of wheel axles, each wheel of the plurality of wheels configured to cause the robotic vehicle to be transported across a contacting surface in response to the rotational motion of the second driveshaft when in contact with the contacting surface.

2. The robotic vehicle of claim 1, further comprising:
   an electronic control system comprising at least one processor and at least one memory device, the electronic control system configured to:
      operate one or more motors of the plurality of motors to rotate one or more gearboxes of the plurality of gearboxes.

3. The robotic vehicle of claim 1, further comprising:
   an electronic control system comprising at least one processor and at least one memory device, the electronic control system configured to:
      operate one or more motors of the plurality of motors to rotate the first driveshaft such that one or more appendages of the plurality of appendages is rotated.

4. The robotic vehicle of claim 1, further comprising:
   an electronic control system comprising at least one processor and at least one memory device, the electronic control system configured to:
      operate one or more motors of the plurality of motors to rotate the second driveshaft such that one or more wheels of the plurality of wheels is rotated.

5. The robotic vehicle of claim 1, wherein the robotic vehicle is configured such that one or more motors of the plurality of motors can be operated to rotate one or more gearboxes of the plurality of gearboxes until the plurality of appendages are substantially positioned beneath the main body of the robotic vehicle.

6. The robotic vehicle of claim 5, wherein the robotic vehicle comprises a front side, a back side, a right side and a left side, and wherein a width of the robotic vehicle between the right side and the left side is less than about 50 inches.

7. The robotic vehicle of claim 1, further comprising:
   a payload control arm coupled to the main body and configured to carry out one or more tasks during operation of the robotic vehicle.

8. The robotic vehicle of claim 1, wherein the plurality of motors comprise:
   a first motor operably coupled to the first driveshaft of the plurality of driveshafts, in a first gearbox of the plurality of gearboxes and a second gearbox of the plurality of gearboxes, the first motor configured to cause controlled rotation of the second gearbox of the plurality of gearboxes;
   a second motor operably coupled to the second driveshaft of the plurality of driveshafts, in the first gearbox of the plurality of gearboxes, the second driveshaft nested within the first driveshaft and operably coupled to an appendage of the plurality of appendages, the second motor configured to rotate the appendage; and
   a third motor operably coupled to a third driveshaft of the plurality of driveshafts, in the first gearbox of the plurality of gearboxes, the third driveshaft nested within the second driveshaft and configured to rotate one or more wheels of the plurality of wheels about one or more wheel axles of the plurality of wheel axles.

9. A drive control system for a robotic vehicle, wherein the drive control system comprises:
   a first motor operably coupled to a first gear in a first gearbox, the first gear operably coupled to an outer driveshaft operably coupled to a second gearbox, the first motor configured to cause controlled rotation of the second gearbox with respect to the first gearbox;
   a second motor operably coupled to a second gear in the first gearbox, the second gear operably coupled to a middle driveshaft nested within the outer driveshaft and operably coupled to a third gear in the second gearbox and an appendage operably coupled to and extending from the second gearbox, the second motor configured to rotate the appendage with respect to the second gearbox;
   a third motor operably coupled to a fourth gear in the first gearbox, the fourth gear operably coupled to an inner driveshaft nested within the middle driveshaft and coupled to a fifth gear in the second gearbox and a plurality of wheels operably coupled to the appendage, the third motor configured to rotate one or more wheels about one or more wheel axles.

10. The drive control system of claim 9, further comprising:
    an electronic control system comprising at least one processor and at least one memory device, the electronic control system configured to:
       operate the first motor to rotate the first gear in the first gearbox and the outer driveshaft such that the second gearbox rotates.

11. The drive control system of claim 9, further comprising:
    an electronic control system comprising at least one processor and at least one memory device, the electronic control system configured to:
       operate the second motor to rotate the second gear, the middle driveshaft, and the third gear, such that the appendage is rotated.

12. The drive control system of claim 9, further comprising:
    an electronic control system comprising at least one processor and at least one memory device, the electronic control system configured to:
       operate the third motor to rotate the fourth gear, the inner driveshaft, and the fifth gear such that the one or more wheels are rotated about the one or more wheel axles.

13. The drive control system of claim 9, wherein the second motor is configured to rotate the appendage with respect to the second gearbox until the appendage is substantially positioned beneath a main body of the robotic vehicle.

14. The drive control system of claim 9, where at least one of the first motor, the second motor, or the third motor is mounted to a planetary gearboxes with a reduction ratio between about 2:1 and about 100:1, about 10:1 to about 90:1, about 20:1 to about 80:1, about 30:1 to about 70:1, or about 40:1 to about 60:1.

15. A robotic vehicle comprising:
a vehicle body configured to support and house components of the robotic vehicle;
a first gearbox disposed at a first corner of the vehicle body;
an outer driveshaft operably coupled to a first gear in the first gearbox at a proximal end and to a second gearbox at a distal end, the second gearbox configured to be rotated about a center point;
a first motor operably coupled to the first gear and configured to cause controlled rotation of the second gearbox;
a middle driveshaft operably coupled to a second gear in the first gearbox at a proximal end and a third gear in the second gearbox at a distal end;
a conveying attachment comprising a proximal end operably coupled to the third gear, a proximal region distal to the proximal end and configured to rotatably engage a first wheel axle, a distal region distal to the proximal region and configured to rotatably engage a second wheel axle, and a distal end, the conveying attachment configured to be rotated about the second gearbox;
a second motor operably coupled to the second gear and configured to cause controlled rotation of the conveying attachment;
an inner driveshaft operably coupled to a fourth gear in the first gearbox at a proximal end and a fifth gear in the second gearbox at a distal end;
a first wheel coupled to the conveying attachment at the first wheel axle and a second wheel coupled to the conveying attachment at the second wheel axle, the first wheel and the second wheel operably coupled to the fifth gear such that rotation of the fifth gear causes the first wheel to rotate about the first wheel axle and the second wheel to rotate about the second wheel axle;
a third motor operably coupled to the fourth gear and configured to cause controlled rotation of the plurality of wheels about the plurality of wheel axles.

16. The robotic vehicle of claim 15, wherein a range of rotation of the proximal end of the conveying attachment about the second gearbox is greater than about 180°.

17. The robotic vehicle of claim 15, further comprising:
an electronic control system comprising at least one processor and at least one memory device, the electronic control system configured to at least one of:
operate the first motor to cause controlled rotation of the second gearbox;
operate the second motor to cause controlled rotation of the conveying attachment; and
operate the third motor to cause controlled rotation of the plurality of wheels about the plurality of wheel axles.

18. The robotic vehicle of claim 17, wherein the electronic control system is configured to operate the first motor to cause controlled rotation of the second gearbox until the conveying attachment is substantially positioned beneath the vehicle body.

19. The robotic vehicle of claim 18, wherein the robotic vehicle comprises a front side, a back side, a right side and a left side, and wherein a width of the robotic vehicle between the right side and the left side is less than about 50 inches.

20. The robotic vehicle of claim 15, where at least one of the first motor, the second motor, or the third motor is mounted to a planetary gearboxes with a reduction ratio between about 2:1 and about 100:1, about 10:1 to about 90:1, about 20:1 to about 80:1, about 30:1 to about 70:1, or about 40:1 to about 60:1.

* * * * *